United States Patent
Huang et al.

(10) Patent No.: US 10,003,788 B2
(45) Date of Patent: Jun. 19, 2018

(54) 3D IMAGE FRAME DISPLAY SYSTEM AND ITS METHOD

(71) Applicant: InnoLux Corporation, Miao-Li County (TW)

(72) Inventors: Li-Ming Huang, Miao-Li County (TW); Yung-Chan Lee, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 67 days.

(21) Appl. No.: 14/831,014

(22) Filed: Aug. 20, 2015

(65) Prior Publication Data
US 2016/0057410 A1    Feb. 25, 2016

(30) Foreign Application Priority Data

Aug. 25, 2014   (TW) .............................. 103129150 A
Dec. 10, 2014   (TW) .............................. 103142990 A

(51) Int. Cl.
*H04N 13/00*      (2018.01)
*H04N 13/04*      (2006.01)
*G02B 27/22*      (2018.01)

(52) U.S. Cl.
CPC ..... *H04N 13/0438* (2013.01); *G02B 27/2264* (2013.01); *H04N 13/0422* (2013.01); *H04N 13/0497* (2013.01)

(58) Field of Classification Search
None
See application file for complete search history.

(56) References Cited

U.S. PATENT DOCUMENTS

| | | | | |
|---|---|---|---|---|
| 6,151,004 A | * | 11/2000 | Kaneko | G09G 3/3413 345/102 |
| 2002/0070914 A1 | * | 6/2002 | Bruning | G09G 3/3413 345/102 |
| 2007/0057959 A1 | * | 3/2007 | Cho | G09G 3/20 345/589 |
| 2007/0120793 A1 | * | 5/2007 | Kimura | G09G 3/3648 345/89 |
| 2007/0200807 A1 | * | 8/2007 | Lee | G09G 3/3413 345/88 |

(Continued)

FOREIGN PATENT DOCUMENTS

| | | |
|---|---|---|
| CN | 101878654 A | 11/2010 |
| CN | 103607583 A | 2/2014 |
| TW | 201324494 A | 6/2013 |

*Primary Examiner* — Antonio Xavier
(74) *Attorney, Agent, or Firm* — Bacon & Thomas, PLLC

(57) ABSTRACT

A 3D image frame display system comprises a liquid crystal panel for alternately displaying a plurality of left-eye frames and a plurality of right-eye frames; a backlight module providing light to the liquid crystal panel when being turned on; and a pair of shutter glasses including a left lens and a right lens, wherein the left lens or right lens is turned on for passing through the light and turned off for shielding the light from the backlight module for corresponding to the left-eye frames or the right-eye frames; wherein, in a time period for forming one of the left-eye frames or one of the right-eye frames, the left lens or the right lens is not turned on earlier than the backlight module, and the left lens or the right lens is not turned off later than the backlight module.

5 Claims, 26 Drawing Sheets

(56) References Cited

U.S. PATENT DOCUMENTS

| | | | | |
|---|---|---|---|---|
| 2007/0222743 A1* | 9/2007 | Hirakata | ............... | G09G 3/3413 345/102 |
| 2008/0129900 A1* | 6/2008 | Sharp | ................... | H04N 9/3111 349/15 |
| 2009/0128472 A1* | 5/2009 | Chen | ................... | G09G 3/3659 345/88 |
| 2009/0267881 A1* | 10/2009 | Takaki | ................. | G09G 3/2022 345/89 |
| 2010/0289883 A1* | 11/2010 | Goris | .................... | G09G 3/003 348/56 |
| 2010/0289974 A1* | 11/2010 | Kim | ................... | G02B 27/2264 349/15 |
| 2011/0074937 A1* | 3/2011 | Nakahata | ............... | H04N 13/00 348/56 |
| 2011/0090308 A1* | 4/2011 | Chen | ..................... | G09G 3/003 348/43 |
| 2012/0033053 A1* | 2/2012 | Park | ................... | H04N 13/0438 348/51 |
| 2012/0086710 A1* | 4/2012 | Chiang | ............. | G02B 27/2264 345/419 |
| 2012/0092331 A1* | 4/2012 | Ogawa | ................... | G09G 3/003 345/419 |
| 2012/0098825 A1* | 4/2012 | Tseng | .................... | G09G 3/003 345/419 |
| 2013/0038684 A1* | 2/2013 | Slavenburg | ........ | H04N 13/0497 348/43 |
| 2013/0038812 A1* | 2/2013 | Roth | .................... | G09G 3/3413 349/61 |
| 2013/0120359 A1* | 5/2013 | Chung | ............... | H04N 13/0497 345/419 |
| 2013/0141424 A1* | 6/2013 | Chang | ................ | H04N 13/0438 345/419 |
| 2014/0043450 A1* | 2/2014 | Goris | ................... | H04N 13/045 348/56 |
| 2014/0063380 A1* | 3/2014 | Yoon | .................. | H04N 13/0438 349/15 |
| 2015/0062189 A1* | 3/2015 | Hwang | .................. | G09G 3/003 345/690 |
| 2015/0145972 A1* | 5/2015 | Irie | ........................... | G09G 3/34 348/55 |
| 2016/0007010 A1* | 1/2016 | Yamakawa | ........ | H04N 13/0438 348/53 |

* cited by examiner

3D IMAGE FRAME DISPLAY SYSTEM AND ITS METHOD

BACKGROUND OF THE INVENTION

1. Field of the Invention

The invention relates to a display system and its method and, more particularly, to a 3D image frame display system and its method.

2. Description of Related Art

Currently, for forming a 3D image frame, it often needs 3D image frame display devices to make a time difference between a left-eye frame shown for left eye of a user and a right-eye frame shown for right eye of the user. That is, the 3D image frame display devices need to respectively generate two frames for left eye and right eye at transient different time points so as to provide the 3D image frame. Therefore, a general 3D display system is composed by a liquid crystal panel, a backlight module and a pair of 3D glasses for being worn by the user, wherein the backlight module alternately provides colors and light source for forming image in a left-eye frame or a right-eye frame and illuminating the left-eye frame data and right-eye frame data that are alternately displayed from pixels of the liquid crystal panel, and the pair of 3D glasses continuously and alternately turns on its left lens and right lens, so that the user can see the left frame and the right frame.

The backlight module generates back light by using a plurality of Light Emitting Diode (LED) devices, wherein a popular LED device is known to be $Y_3Al_5O_{12}$:CeLED (YAG LED) composed by a blue chip and a yellow phosphor for generating light and color required by the liquid crystal panel. However, the color saturation of such an LED device is not satisfactory, and thus a new LED (B+Rnew LED) composed by a blue chip, a red phosphor and a green phosphor is introduced recently. Although this new LED device can provide great color saturation, it has a slow response time when it is turned off, resulting in a crosstalk between the left-eye frame and the right-eye frame due to that colors and light of the left-eye frame provided by the back light plate are not completely vanished when the display of the left-eye frame is finished and the display of the right-eye frame is started.

Therefore, there is a need to provide an improved 3D image frame display device for providing excellent color saturation and eliminating the problem of slow back light response.

SUMMARY OF THE INVENTION

One object of the invention is to provide a 3D frame display system, which comprises: a liquid crystal panel for alternately displaying a plurality of left-eye frames and a plurality of right-eye frames; a backlight module being a light source for the liquid crystal panel and providing light to the liquid crystal panel when being turned on; and a pair of shutter glasses including a left lens and a right lens, wherein the left lens is turned on for passing through the light and turned off for shielding the light from the backlight module for corresponding to the left-eye frames, the right lens is turned on for passing through the light and turned off for shielding the light from the backlight module for corresponding to the right-eye frames, wherein, in a time period for forming one of the left-eye frames or in a time period for forming one of the right-eye frames, the left lens or the right lens is not turned on earlier than the backlight module, and the left lens or the right lens is not turned off later than the backlight module. Thus, the user wearing the pair of shutter glasses can avoid seeing the slow backlight response when the backlight module is turned off, thereby solving the problem of slow backlight response.

In a preferred embodiment, the liquid crystal panel further includes a plurality of scan lines, which are sequentially scanned to form one of the left-eye frames or one of the right-eye frames, the one of the left-eye frames and the one of the right-eye frames are alternately displayed; and the backlight module includes a plurality of lighting bars for respectively corresponding to at least one of the scan lines, and is sequentially turned on to provide light source to the liquid crystal panel; wherein, in the time period for forming one of the left-eye frames or in the time period for forming one of the right-eye frames, the left lens or the right lens is not turned on earlier than a first lighting bar, and the left lens or the right lens is not turned off later than a last lighting bar. Thus, the user wearing the pair of shutter glasses can avoid seeing the slow response when different lighting bars are turned off and the remained image generated by the slow backlight response when the backlight module is turned off, thereby solving the problem of slow backlight response.

Another object of the invention is to provide a 3D image frame display system, comprising: a liquid crystal panel having a plurality of pixels for displaying a first 3D image, wherein the first 3D image including a first display frame, a second display frame, a first display removing frame and a second display removing frame, and the first display removing frame is inserted between the first display frame and the second display frame, and the second display removing frame is inserted after the second display frame or before the first display frame; a backlight module for providing a light passing through the liquid crystal panel, the light including a plurality of lighting waveforms with different colors, and a difference in rising time or in falling time between lighting waveforms of at least two color being bigger than 1 millisecond; and a pair of shutter glasses including a first lens and a second lens, wherein the first lens is turned on for passing through the light and turned off for shielding the light from the backlight module for corresponding to the first display frame, and the second lens is turned on for passing through the light and turned off for shielding the light from the backlight module for corresponding to the second display frame. Thus the problem of the slow backlight response can be removed by busing the first display removing frame and the second display removing frame.

Other objects, advantages, and novel features of the invention will become more apparent from the following detailed description when taken in conjunction with the accompanying drawings.

DETAILED DESCRIPTION OF THE PREFERRED EMBODIMENT

Figure 1A:
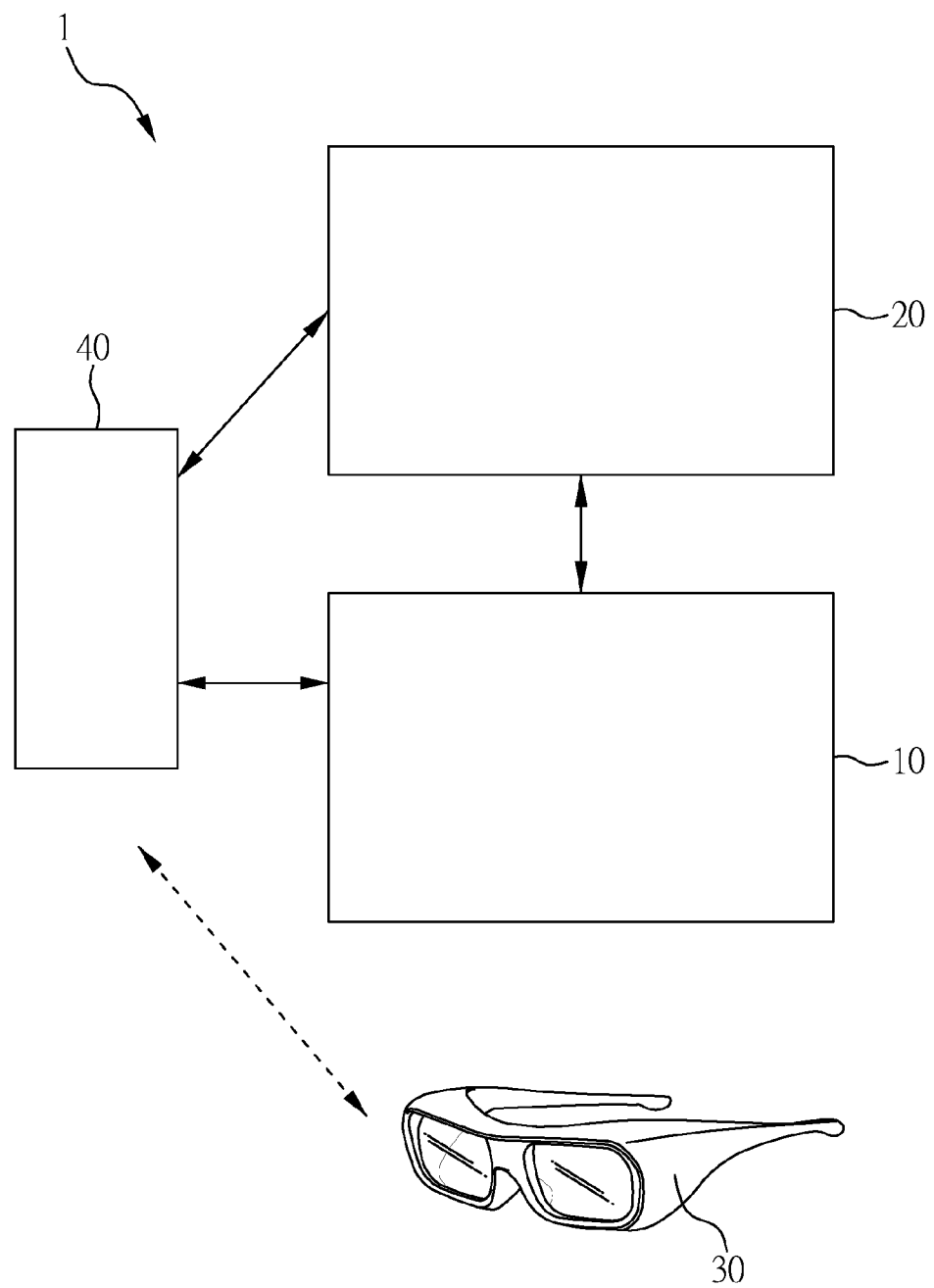
FIG. 1(A) schematically illustrates the first structure of a 3D image frame display system according an embodiment of the invention.

FIG. 1(A) schematically illustrates the first structure of a 3D image frame display system 1 according an embodiment of the invention. The first structure of the 3D image frame display system 1 is provided to eliminate the problem of the slow backlight response. As shown in FIG. 1(A), the 3D image frame display system 1 at least includes a liquid crystal panel 10, a backlight module 20, a pair of shutter glasses 30 and a controller 40. The liquid crystal panel 10 has a plurality of pixels used to display frames. The backlight module 20 is used to provide light source to the liquid crystal panel 10, so that the frames displayed by the liquid crystal panel 10 are provided with brightness. Due to that 3D effect of a 3D image frame is achieved by forming image in a user's left eye and right eye at different time, a 3D image frame has to include a left-eye frame and a right-eye frame, and thus the system 1 has to cooperate with the pair of shutter glasses 30 to achieve the purpose of forming the 3D image frame. Therefore, the system 1 also needs the controller 40 to control the liquid crystal panel 10, the backlight module 20 and the pair of shutter glasses 30 for operating with each other. Accordingly, when the liquid crystal panel 10 alternately displays a plurality of left-eye frames and a plurality of right-eye frames, a plurality of 3D image frames can be generated.

The liquid crystal panel 10 has a plurality of data lines and scan lines respectively controlled by their control circuits. The scan lines are generally arranged in horizontal direction and are scanned from a first scan line on the top of the liquid crystal panel 10 to a last scan line on the bottom of the liquid crystal panel 10. When all scan lines are scanned, a left-eye frame or a right-eye frame can be generated, and the user wearing the pair of shutter glasses 30 can see a 3D image frame. After all scan lines are scanned, scan operation returns to the first scan line for proceeding with image formation in next right-eye frame or left-eye frame.

The backlight module 20 has a plurality of LED devices used to provide light source to the liquid panel 10. Preferably, the backlight module 20 further has a plurality of lighting bars, each lighting bar is corresponded to at least one scan line. The controller 40 can control the lighting time of the lighting bars for corresponding to the scan time of the scan lines. The LED devices are preferably new LED devices composed by blue chips, red phosphors and green phosphors, and thus the liquid crystal panel 10 can provide better color purity. The backlight module 20 can be turned on or turned off. In a preferred embodiment, the backlight module 20 has a switch controlled by the controller 40 for turning on or turning off the back light. However, in other embodiments, the switch is not limited to be disposed on the backlight module 20. Alternatively, the switch can be disposed on other units out of the backlight module 20, or the backlight module 20 is directly controlled by the controller 40 to be turned on or turned off.

Figure 1B:
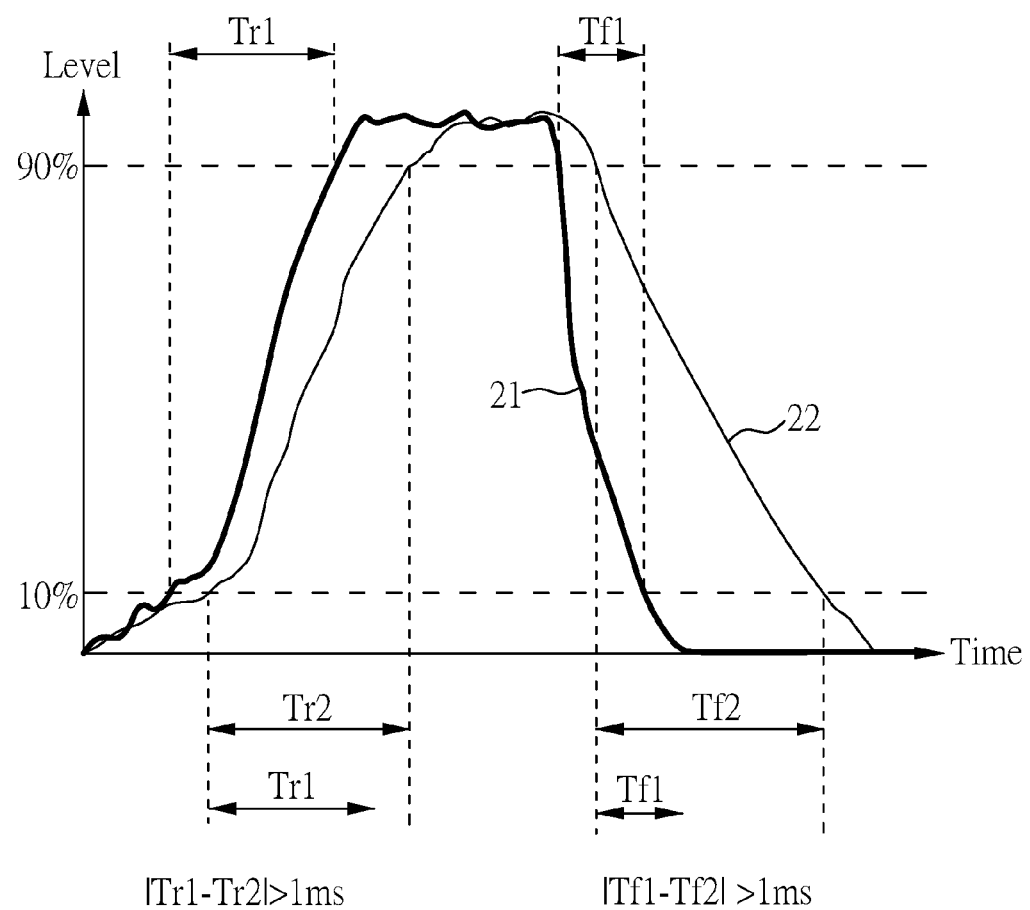
FIG. 1(B) schematically illustrates waveform rising time of different color light source for a backlight module of the first structure.

In some embodiments, the backlight module 20 further includes at least three light source groups, each light source group with one color and includes a plurality of light sources, preferably, the light source groups are a red light source group including a plurality of red color light sources, a green light source group including a plurality of green color light sources and a blue light source group including a plurality of blue color light sources. Wherein, a difference in rising time between lighting waveforms or a difference in falling time between lighting waveforms of at least two different color light sources is bigger than 1 millisecond (msec). For example, as shown in FIG. 1(B), a first color light source 21 (e.g. a red color light source) has a rising time Tr1 and a falling time Tf1, and a second color light source 22 (e.g. a green color light source) has a rising time Tr2 and a falling time Tf2. When a difference |Tr1−Tr2| in the rising time between the two color light sources or a difference |Tf1−Tf2| in the falling time between the two color light sources is bigger than 1 msec. Using the system 1 of the invention, the better 3D image frame effect can be provided.

In other embodiments, the backlight module 20 includes only one type light source providing the light passing through the liquid crystal panel 10, after the light passes through the liquid crystal panel 10, the light may include a plurality of lighting waveforms with different colors, and a difference in rising time or in falling time between lighting waveforms of at least two color is bigger than 1 millisecond.

The pair of shutter glasses 30 has a left lens and a right lens, and each lens can be controlled to be sequentially turned on for passing through the light and turned off for shielding the light. In a prefer embodiment, the pair of shutter glasses 30 has a switch for turning the left lens and the right lens on or off. The switch is controlled by the controller 40 to correspond to the left-eye frame and the right-eye frame. That is, when the liquid crystal panel 10 displays the left-eye frame, the controller 40 controls the backlight module 20 to generate back light, and turns on the left lens of the pair of shutter glasses 30 for passing through the light, so that the left eye of the user can see the left-eye frame. However, in another embodiment, the switch is not limited to be disposed on the pair of shutter glasses 30. Alternatively, the switch can be disposed on units out of the pair of shutter glasses 30, or the lens can be directly turned on and turned off by the controller 40. Besides, the controller 40 can control the pair of shutter glasses 30 via a wireless connection, but this is not a limit.

Figure 2A:
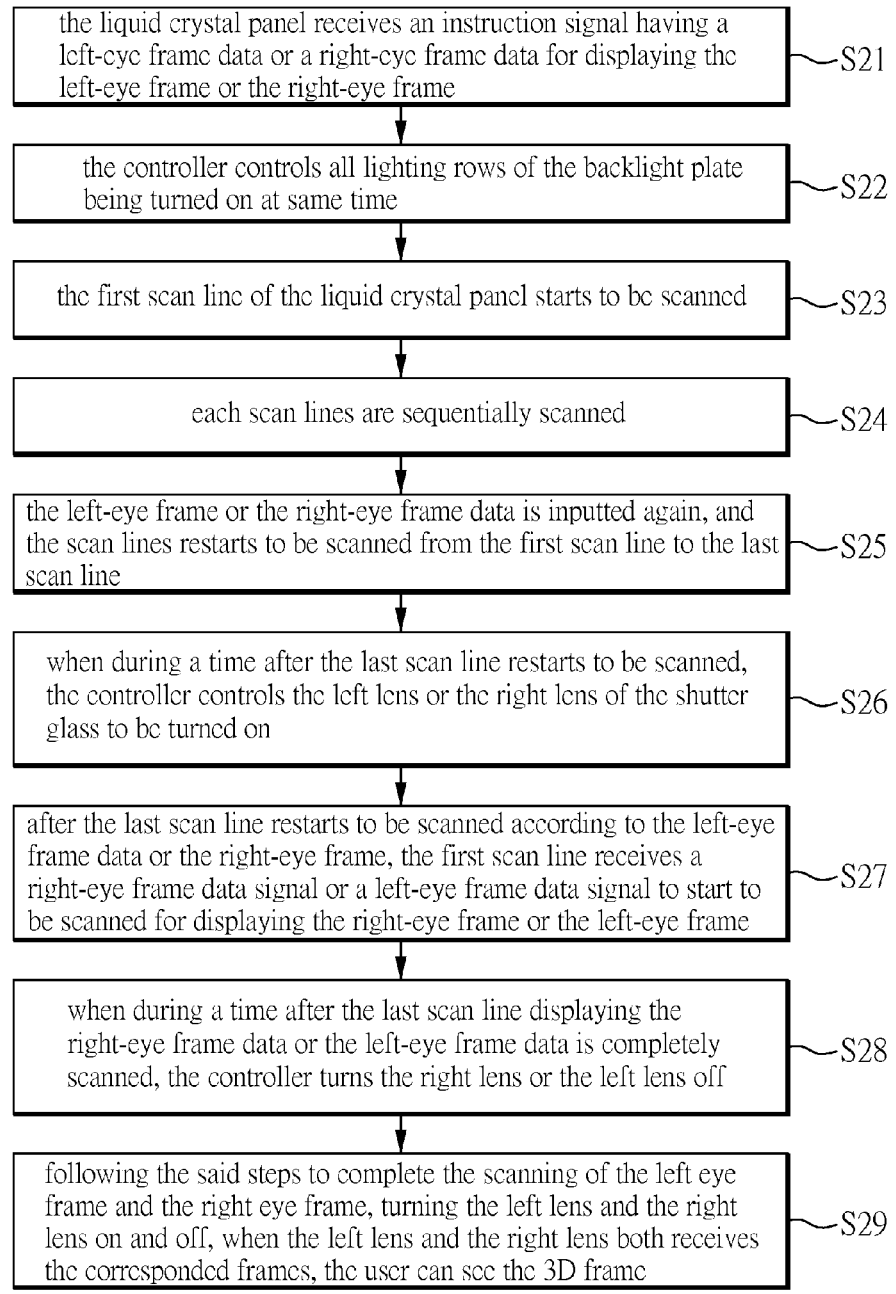
FIG. 2(A) is a flow chart of a first operating method in the first structure.

FIG. 2(A) is a flow chart of a first operating method for improving the slow backlight response of the 3D image frame in the first structure of the invention. This method is executed by the system 1 of FIG. 1(A). At first, step S21 is executed, in which the liquid crystal panel 10 receives a left-eye frame data signal or a right-eye frame data signal, wherein the left-eye frame data signal or the right-eye frame data signal is provided for all scan lines to start to be scanned for displaying the one left-eye frame or the one right-eye frame. That is, the liquid crystal panel 10 receives an instruction signal for displaying the left-eye frame or the right-eye frame, and the instruction signal includes the left-eye frame data and the right-eye frame data to be displayed. Then, step S22 is executed, in which, after the instruction signal is received, the controller 40 controls all lighting bars of the backlight module 20 to be turned on at the same time. Then, step S23 is executed to start scanning a first scan line of the liquid crystal panel 10. That is, when the liquid crystal panel 10 receives the left-eye frame data signal or the right-eye frame data signal, the controller 40 turns on all LED devices of the backlight module 20 at the same time, and the scan lines are scanned at a time which is the same as or later than that of the backlight module 20. Then, step S24 is executed to continue scanning each scan line until the last scan line. Thus, it starts to charge each pixel of each scan line to a predetermined voltage. Then, step S25 is executed, in which the left-eye frame or the right-eye frame data is inputted again, and it starts to scan the scan lines again from the first scan line to the last scan line. Then, step S26 is executed, in which, during a time period after starting to scan the last scan line again, all pixels of the first scan line are preferably charged to the predetermined voltage, and the controller 40 controls the left lens or the right lens of the pair of shutter glasses 30 to be turned on. That is, after starting to scan all of the scan lines, the controller 40 then controls the left lens or the right lens of the pair of shutter glasses 30 worn by the user to be turned on or off. If the left-eye frame is displayed now, the left lens is turned on and the right lens is turned off, and thus left eye of the user can receive the left-eye frame. Then, step S27 is executed, in which, after starting to scan the last scan line again according to the left-eye frame data, the first scan line receives a right-eye frame data signal so as to start performing a scan for displaying the right-eye frame. Then, step S28 is executed, during a time period after completely scanning the last scan line of the right-eye frame data, preferably, after all pixels of the last scan line have been charged to the predetermined voltage, the controller 40 turns off the right lens. Then, step S29 is executed, in which the system 1 completes the scanning of the left eye frame or the right eye frame, and turns the left lens or the right lens on and turns the left lens or the right lens off according to the aforementioned steps. When the left lens and the right lens both receive the corresponding frames, the user can see a 3D image frame.

It is noted that, in this embodiment, the backlight module 20 is kept on after being turned on; i.e., the backlight module 20 is continuously turned on during the scan lines are scanned. Thus, it can avoid the problem that the user may see different corresponding frame caused by the slow backlight response of the backlight module 20. Besides, because the left-eye frame or the right-eye frame is gradually vanished, the left lens or the right lens is turned on when the first scan line is completely scanned but the last scan line is not yet completely scanned, and it has started to scan the first scan line for the right-eye frame or the left-eye frame. Because the right-eye frame is not yet completely formed at this moment, the left lens that is turned on at this moment only receives the left-eye frame gradually vanished instead of the right-eye frame gradually formed.

Figure 2B:
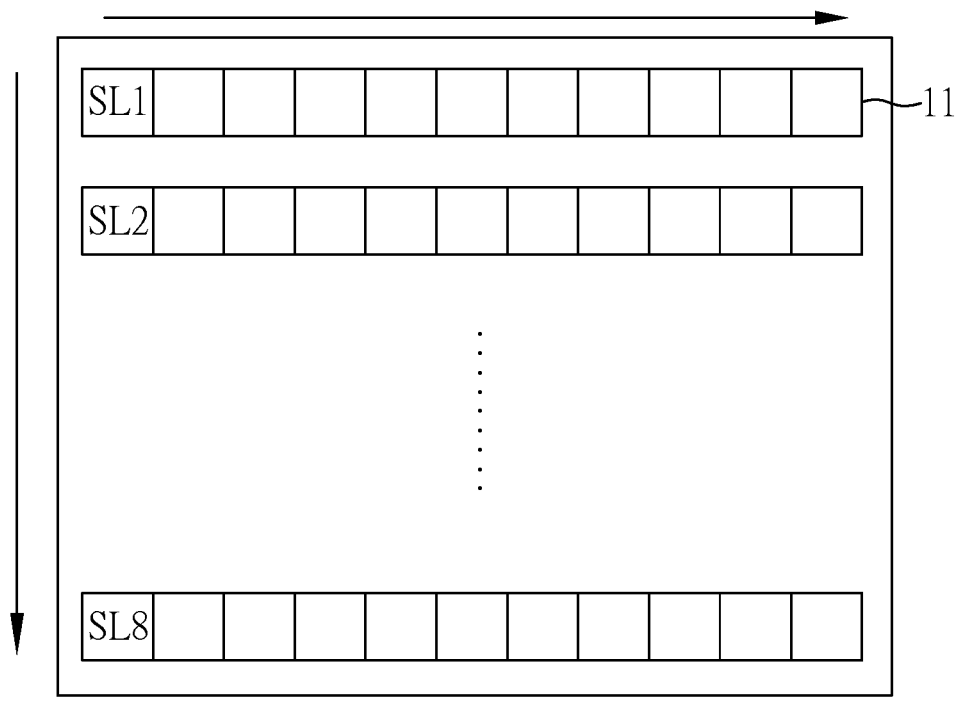
FIG. 2(B) is a schematic diagram of a liquid crystal panel with a plurality of scan lines as described in FIG. 2(A)
Figure 2C:
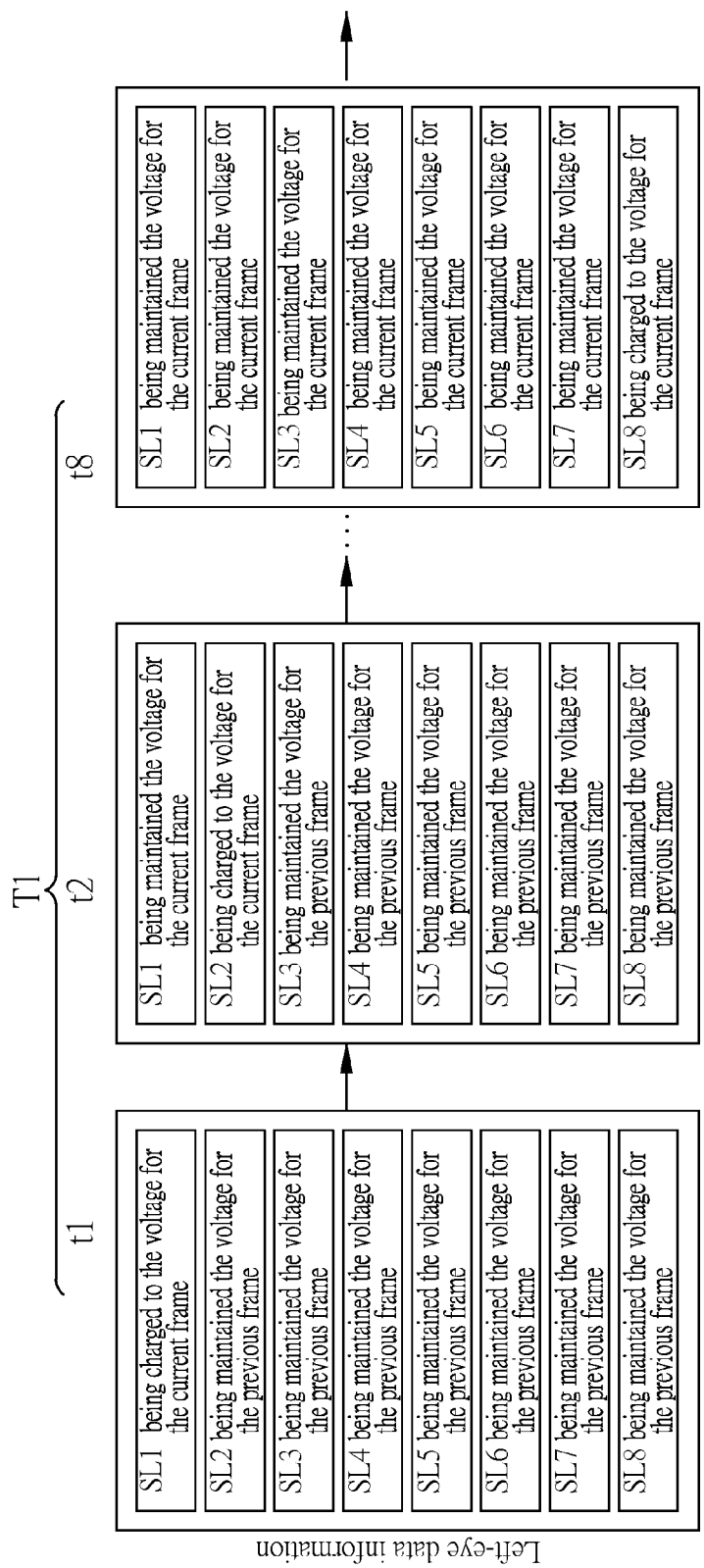
FIG. 2(C) schematically illustrates the operating status of the liquid crystal panel in time t1 to t8.
Figure 2D:
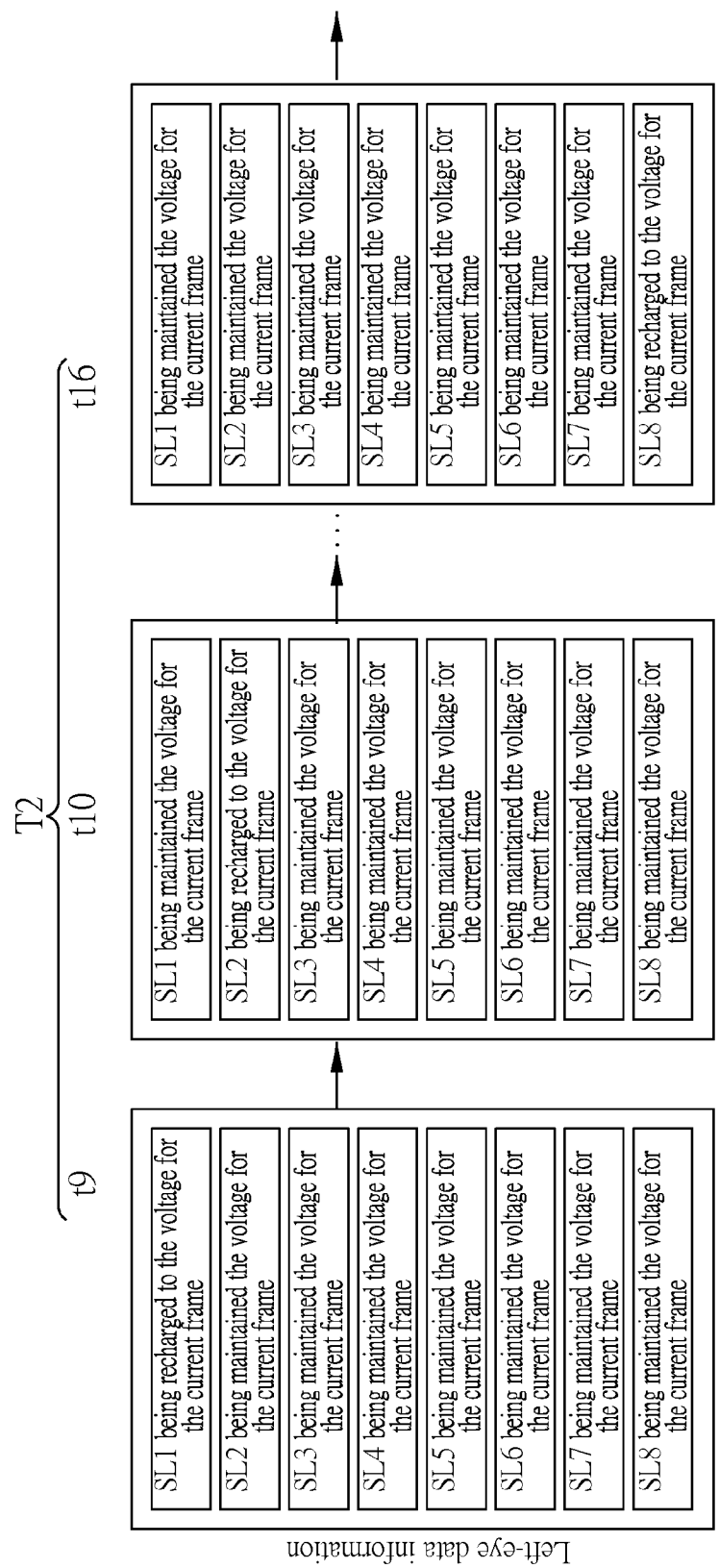
FIG. 2(D) schematically illustrates the operating status of the liquid crystal panel in time t9 to t16.
Figure 2E:
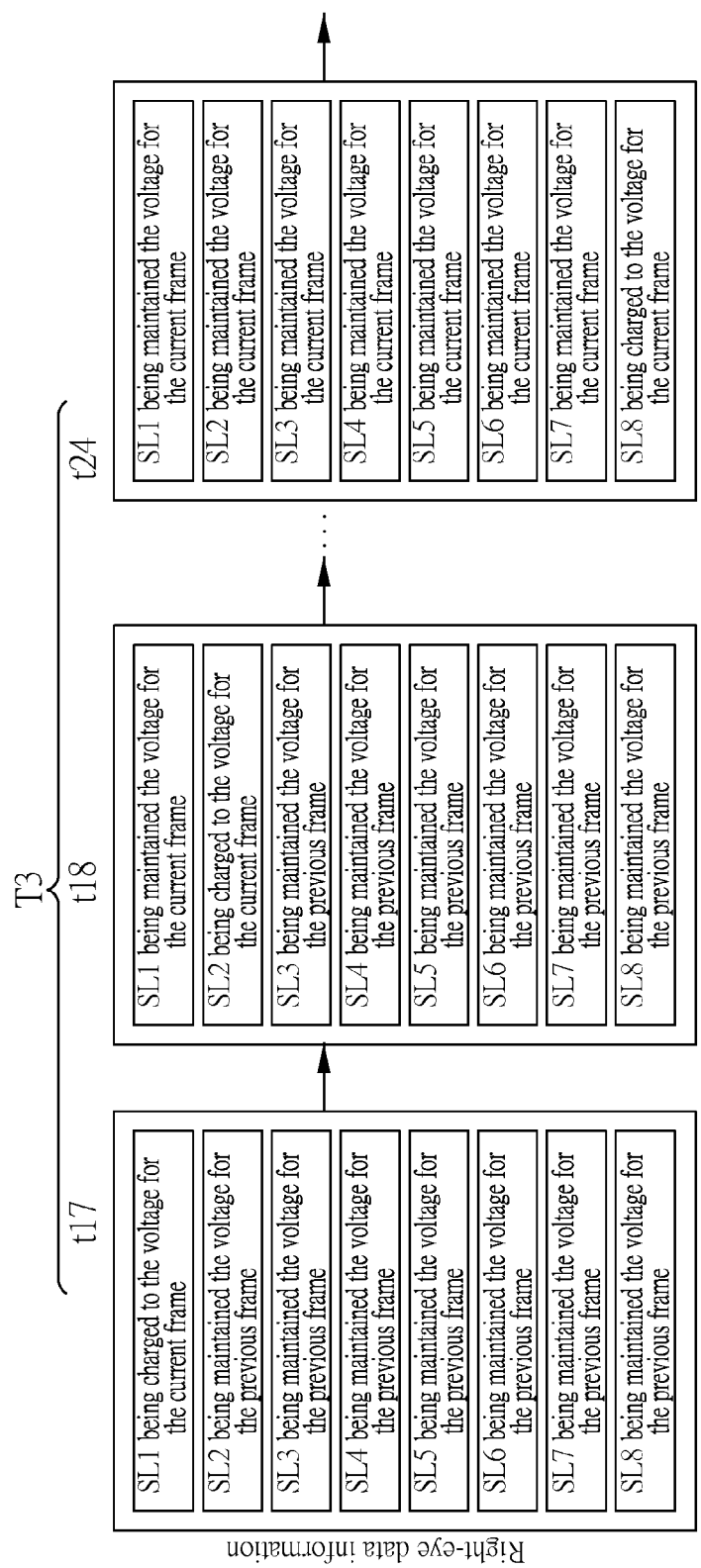
FIG. 2(E) schematically illustrates the operating status of the liquid crystal panel in time t17 to t24.

FIG. 2(B) is a schematic diagram of a plurality of scan lines of the liquid crystal panel 10 as described in steps S21 to S28 of FIG. 2(A). For clear description, eight scan lines SL1 to SL8 of the liquid crystal panel 10 are shown for illustrative purpose.

FIG. 2(C) to FIG. 2(F) are schematic diagram of detailed operating statuses of the flow in FIG. 2(A). With reference to FIG. 2A to FIG. 2F, at first in time period T1, it starts to scan the scan lines SL1 to SL8 for displaying a left-eye frame; i.e., the liquid crystal panel 10 performs image formation in the left-eye frame, and the scan lines are not scanned for the right-eye frame at this moment. The time period T1 is preferably approximated to half of 8.333 ms and is equally divided into time t1 to t8. In time t1, it starts to scan the first scan line SL1 for forming image in the left-eye frame, so as to start charging the pixels on the scan line SL1 and increasing the voltages thereof to predetermined values, respectively. Thus, the pixels are turned on to display the left-eye frame data. In time t1, the pixels of the first scan line SL1 are in an initial charging status, and the other scan lines SL2 to SL8 are maintained to display a previous frame data (i.e., a previous right-eye frame completely scanned). In time t2, it starts to scan the second scan line SL2, so as to start charging the pixels on the scan line SL2. The other scan lines are sequentially scanned (in time t3 to time t7) until time t8. In time t8, it starts to scan the last scan line SL8 to increase the voltage and, at this moment, the pixels of the other scan lines SL1 to SL7 are still maintained with their voltages, i.e. in liquid crystal transition response.

Then, in time period T2, the scan lines SL2 to SL8 are scanned again for the left-eye frame; i.e., the pixels on each scan line SL1 to SL8 are charged again for displaying the left-eye frame. Because the pixels on each scan line SL1 to SL8 have been charged in time period T1, recharging in time period T2 can reduce the time required to charge the voltage level of each pixel to the predetermined voltage. In addition, as time period T1, time period T2 is preferred to be half of 8.333 ms and can be equally divided into time t9 to t16. In time t9 to t15, the scan lines are sequentially charged. In time t16, the voltages the pixels of the scan lines SL1 to SL7 are maintained with their voltages, and it starts to scan the scan line SL8 again for left-eye frame. Because the pixels of at least seven scan lines SL1 to SL7 are charged to predetermined voltage for displaying the left-eye frame data in time t16, the controller 40 can turn on the left lens of the pair of shutter glasses 30 in time t16, so that left eye of the user starts to receive the left-eye frame data. However, the controller 40 can also turn on the left lens when the pixels on the first scan line SL1 have been charged to predetermined voltages. It is noted that generating the left-eye frame by respective charging in time periods T1 and T2 is known as a frequency multiplication design, which can reduce the difference between the charging level of top portion of the frame and the charging level of bottom portion of the frame, so that images of the frame can be more consistent. However, the invention can also be applied without frequency multiplication design; i.e., the left-eye frame is generated by charging only one time and then it switches to the right-eye frame.

Then, in time period T3, the first scan line SL1 is operated for the right-eye frame according to the right-eye frame data signal and, at this moment, the liquid crystal panel 10 starts forming image in the right eye frame. In time t17, it starts to scan and charge the pixels of the scan line SL1 to predetermined voltages for displaying the right eye frame data. In time t18, it starts to charge the pixels of the second scan line SL2. In time t19 to t24, it continues to scan the scan lines SL3 to SL8 for the right-eye frame. It is noted that, before time 24, due to the response time of liquid crystals, the liquid crystals slowly transits from the voltage level of the left-eye frame to the voltage level of the right-eye frame. That is, at a predetermined time point before time t24, the liquid crystals no longer maintain the voltage level of the left-eye frame, and the left lens is turned off. When the left lens is turned off and it starts to scan the scan lines again for the right-eye frame, the right lens is turned on.

More specifically, the backlight module 20 is continuously turned on in time periods T1 to T3, thereby avoiding the problem that back lights of frames viewed by different eyes may be overlapped due to the slow response of the LED devices. Besides, the left lens of the pair of shutter glasses 30 is preferred to be turned on when starting to scan all scan lines SL1 to SL8 for the second time for the left-eye frame. When scanning the last scan line SL8 for the second time, the pixels on the first scan line SL1 have been charged to predetermined voltages for displaying a partial image of the left-eye frame, so that the user can start to receive the image of the left-eye frame. Therefore, for increasing the brightness sensed by human eyes, the left lens of the pair of shutter glasses 30 can be turned on during a time after the first scan line SL1 is scanned for the second time. The left lens of the pair of shutter glasses 30 is preferred to be turned off during a time after the last scan line SL8 is scanned for the second time. That is, when liquid crystals maintain voltage level status of the left-eye frame and before liquid crystals transit to voltage level status of the right-eye frame, the left lens is turned off, o that the user can receive full image data. It is noted that the time of turning on the lens is very short, so that, instead of seeing the scan lines sequentially displaying the frame, the user directly senses the generation of a full left-eye frame. Besides, when the left-eye frame and the right-eye frame are both generated, a 3D image frame can be formed to be viewed by the user.

Figure 2F:
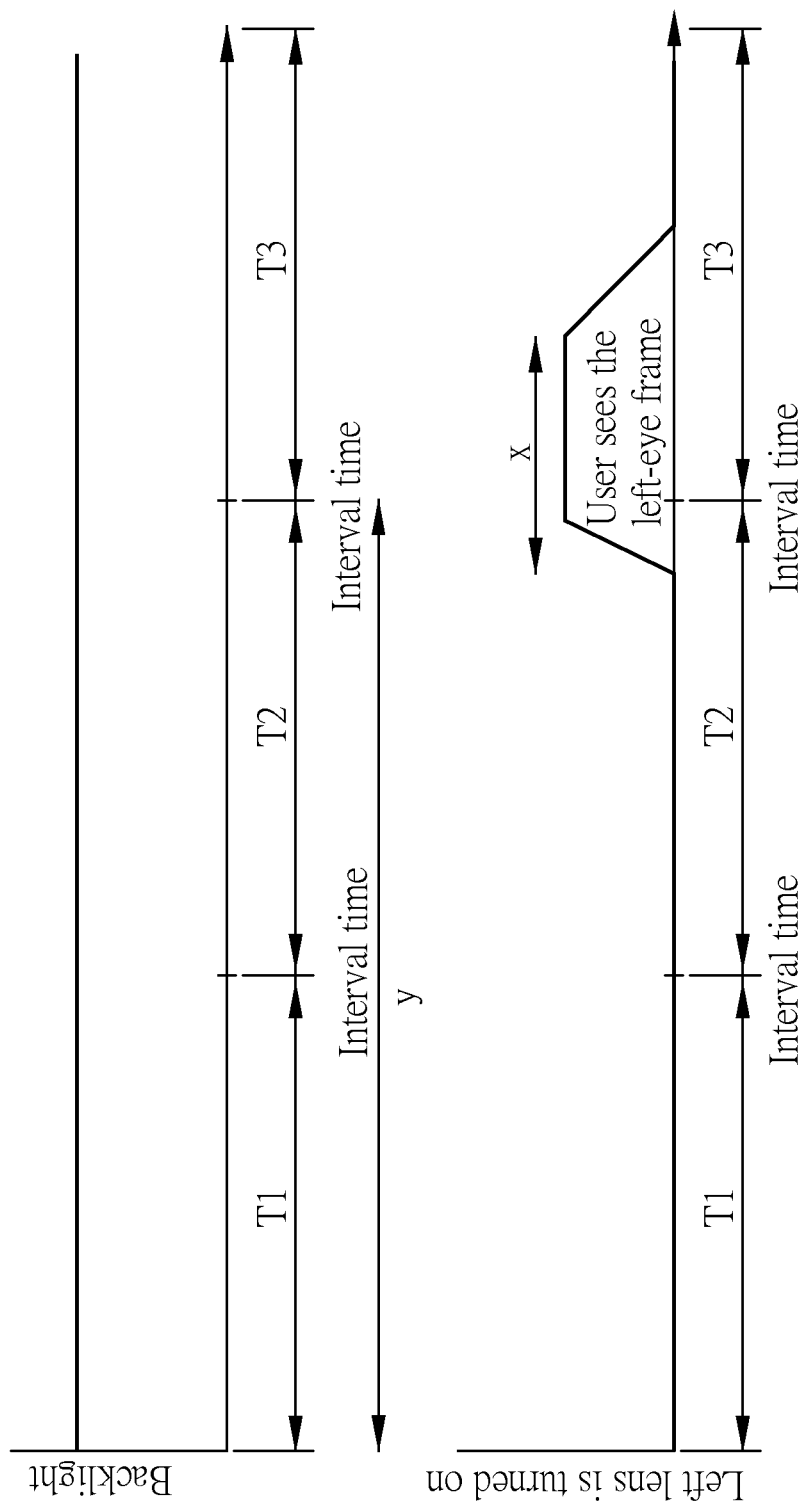
FIG. 2(F) schematically illustrates the operating status of the backlight module and a pair of shutter glasses corresponding to time t1 to t24.

In addition, please refer to FIG. 2(F) again, the left lens or the right lens of the pair of shutter glasses 30 is turned on for a time period, as denoted by 'x' in FIG. 2(F), which is 0.5 to 0.9 times as a period for forming image in the left-eye frame or the right-eye frame, as denoted by 'y' in FIG. 2(F), i.e. x/y=50~90(%). The backlight module 20 is turned on for a period, which is 0.35 to 1 times as a period 'y' for forming image in the left-eye frame or the right-eye frame. The period 'y' is equal to the total scan time for forming image in the left-eye frame or in the right-eye frame, as shown in FIG. 2(F), i.e. the period for forming image in one left-eye frame or one right-eye frame is a period from the first scan line starting to be scanned to the last scan line finishing to be scanned at least one time for displaying the one left-eye frame or the one right-eye frame. Because this embodiment is a frequency multiplication design, the period 'y' is twice of the frame refresh time (one frame time). In other design using original frequency, the frame of the left eye or the right eye is scanned only once, and thus the period 'y' is one time of the frame refresh time (one frame time). A formula therefor can be defined as follows: for the pair of shutter glasses 30, x=a time period in which the left lens or the right lens is turned on for the left-eye frame or the right-eye frame, y=total scan time of the left-eye frame or the right-eye frame; for the backlight module 20, x=a time period in which the backlight module 20 is turned on for the left-eye frame or the right-eye frame, y=total scan time of the left-eye frame or the right-eye frame.

Figure 3A:
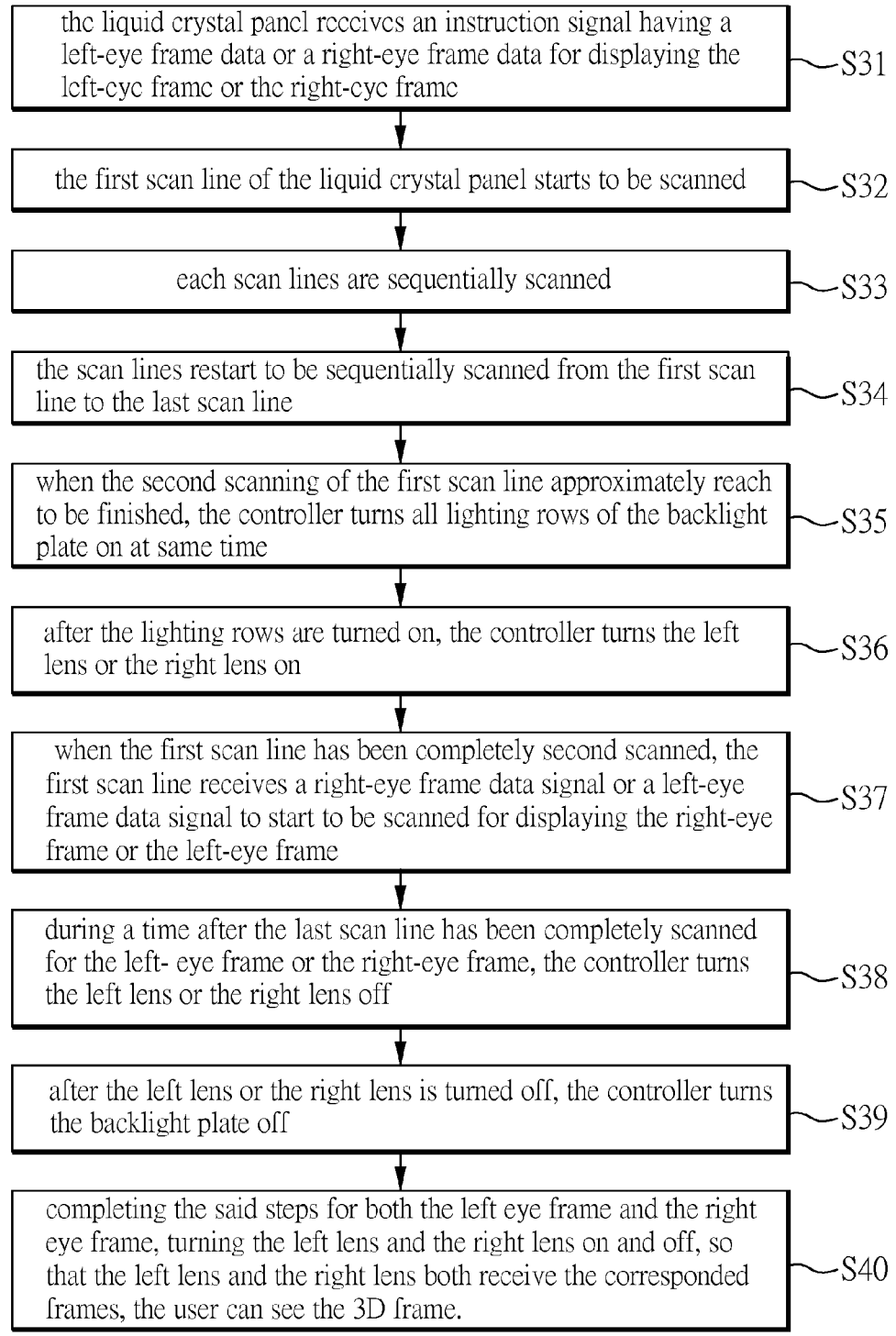
FIG. 3(A) is a flow chart of a second operating method in the first structure.

FIG. 3(A) is a flow chart of a second operating method for improving the slow backlight response of the 3D image frame in the first structure of the invention. The method is executed by the system 1 of FIG. 1(A). At first, step S31 is executed, in which the liquid crystal panel 10 receives a left-eye frame data signal or a right-eye frame data signal; i.e., the liquid crystal panel 10 receives an enable signal and a left-eye frame data or the right-eye frame data to be displayed. Then, step S32 is executed to start scanning the first scan line SL1 of the liquid crystal panel 10. Next, step S33 is executed to sequentially scan each scan line until the last scan line. Next, step S34 is executed to start sequentially scanning the scan lines again from the first scan line. Next, step S35 is executed, in which, when the pixels on the first scan line are charged to approach to predetermined voltages, the controller 40 turns on all lighting bars of the backlight module 20 at the same time. Next, step S36 is executed, in which, after the lighting bars are turned on and it starts to scan the last scan line, the controller 40 turns on the left lens or the right lens of the pair of shutter glasses 30. That is, when it starts to scan all scan lines for the second time, preferably after the pixels on the first scan line have been charged to predetermined voltages (the liquid crystals are transited to voltage status of the left-eye frame), the controller 40 then turns on the left lens or the right lens of the pair of shutter glasses worn by the user. If the left-eye frame (or the right-eye frame) is formed at this moment, the left lens (or the right lens) is turned on for passing through the light and the right lens (or the left lens) is turned off, so that the left eye or right eye of the user can receive the corresponding frame. Next, step S37 is executed, in which, when the first scan line has been completely scanned for the second time, the first scan line receives a right-eye frame data signal or a left-eye frame data signal to start scanning operation for the right-eye frame or the left-eye frame (i.e. perform scanning for the frame of the other eye). Next, step S38 is executed, in which, during a time after the last scan line has been completely scanned for the left-eye frame or the right-eye frame, the controller 40 turns off the left lens or the right lens of the pair of shutter glasses 30. Next, step S39 is executed, in which, after the left lens or the right lens is turned off, the controller 40 turns the backlight module 20 off. Next, step S40 is executed, in which the system 1 achieves scanning of the frame corresponding to the other eye and turning on/off the lens corresponding thereto based on the aforementioned steps, such that, when the left lens and the right lens both receive corresponding frames, the user can see a 3D image frame.

It is noted that, in this embodiment, the backlight module 20 is not continuously turned on. Instead, it is turned on when the pixels of the first scan line are charged to approach to predetermined voltages, and it is turned off before starting to charge the last scan line for the frame corresponding to the other eye. Further, the lens is turned on after the backlight module 20 is turned on, and is preferred to be turned off before the backlight module 20 is turned off. Thus, although the LED devices may continue to light when the backlight module 20 is turned off, the light cannot be seen by the user because the lens has been turned off.

Figure 3B:
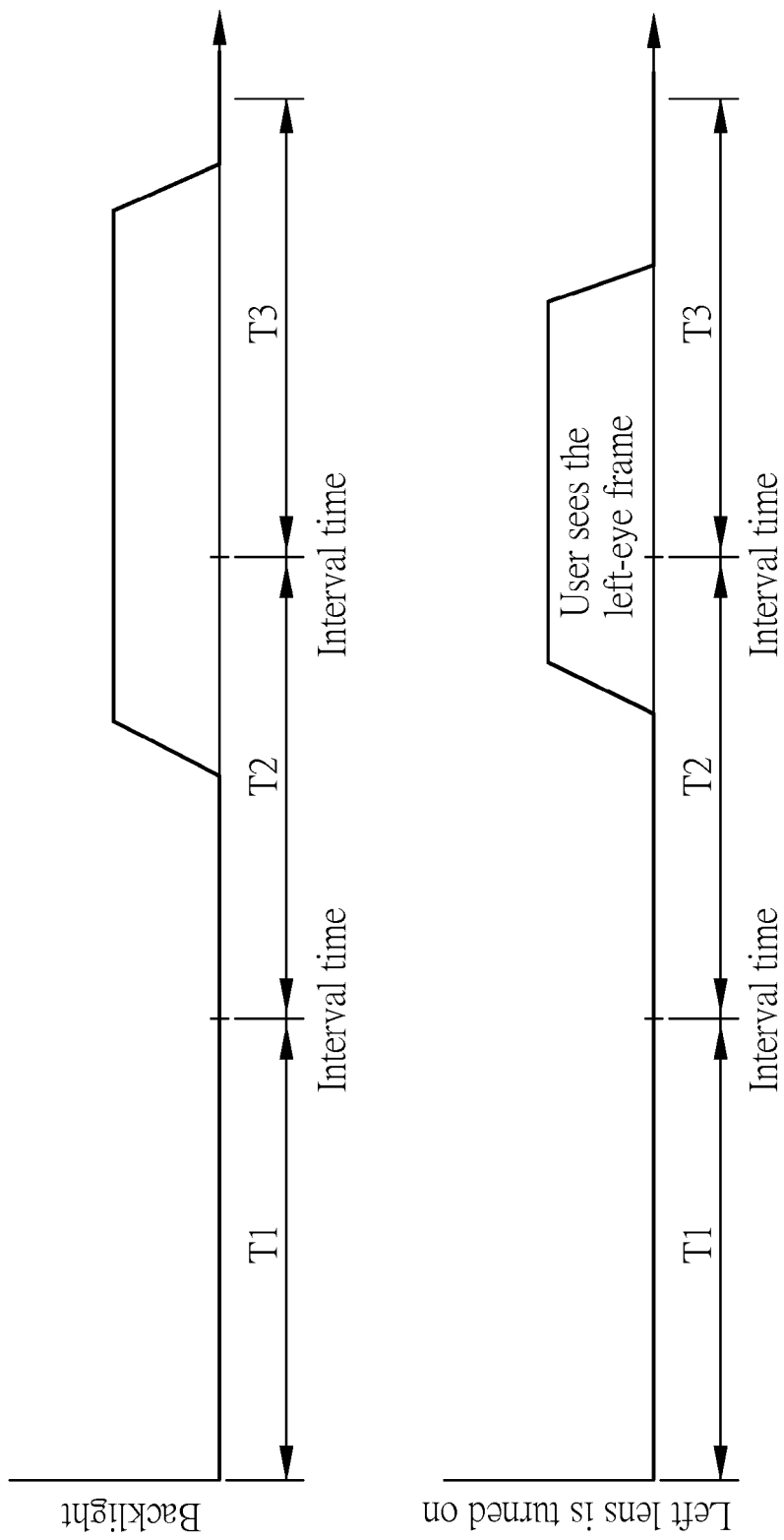
FIG. 3(B) schematically illustrates a first operating status of the backlight module and the pair of shutter glasses corresponding to time t1 to t24 according to the second operating method of the first structure.

FIG. 3(B) schematically illustrates detailed operating status of the flow according to FIG. 3(A). Please refer to FIG. 3(B) as well as FIGS. 2(C) to 2(E). In this embodiment, the scanning process of scan lines for the left-eye frame and the right-eye frame is similar to that shown in FIGS. 2(C) to 2(E) except for the time period in which the backlight module 20 is turned on and turned off. With reference to FIGS. 2(C) to 2(E) and FIG. 3(B), in time t9 to t16, i.e. before the pixels of the first scan line SL1 are almost completely charged again for the left-eye frame, the LED devices of the backlight module 20 are turned on at the same time, so as to provide back light when the first scan line SL1 is completely charged and a part of the frame is displayed. Furthermore, after the backlight module 20 generates the back light, the left-eye lens of the pair of shutter glasses 30 is turned on and, similar to the first embodiment, the left lens is preferred to be turned on after starting to scan all scan lines SL1 to SL8 for the second time for the left-eye frame or the right-eye frame. Because the first scan line SL1 has been charged to predetermined voltages for displaying a part of the left-eye frame or the right-eye frame when starting to scan the last scan line SL8 for the second time, the user can start to receive the frame. Therefore, in order to increase brightness sensed by the user, the left lens of the pair of shutter glasses 30 is preferred to be turned on during a time after starting to scan the first scan line SL1 for the second time, and the left lens is preferred to be turned off during a time after starting to scan the last scan line SL8 for the second time. That is, when liquid crystals maintain the voltage status of the left-eye frame and before liquid crystals are transited to the voltage status of the right-eye frame, the left lens is turned off, so that the user can receive the full left-eye frame. In time t19 to t24, i.e. after the left lens is turned off, the backlight module 20 is turned off, so that the left lens is not corresponding to the delay caused by the slow backlight response, thereby avoiding the problem that the user may see different and overlapped frames.

It is noted that, in this embodiment, the backlight module 20 is turned on before the left lens is turned on, and the backlight module 20 is turned off after the left lens is turned off, so that the slow back light response problem is not encountered when the left lens is on, and thus the user can avoid seeing frames of different eyes. In this embodiment, the lens is turned on after the backlight module 20 is turned on and is turned off before the backlight module 20 is turned off. However, in other embodiments, the slow back light response problem can be solved either by turning on the backlight module 20 before turning on the left lens or by turning off the backlight module 20 after turning off the left lens. Besides, the left lens or the right lens of the pair of shutter glasses 30 is turned on for a time period which is 0.5 to 0.9 times as a time period for forming image in the left-eye frame or the right-eye frame, and the backlight module 20 is turned on for a time period which is 0.35 to 1 times as a time period for forming image in the left-eye frame or the right-eye frame. In other words, the left lens or the right lens is turned on for a time period which is 0.5 to 0.9 times as a time period for scanning the left-eye frame or the right-eye frame, and the backlight module 20 is turned on for a time period which is 0.35 to 1 times as a time period for scanning the left-eye frame or the right-eye frame.

Figure 3C:
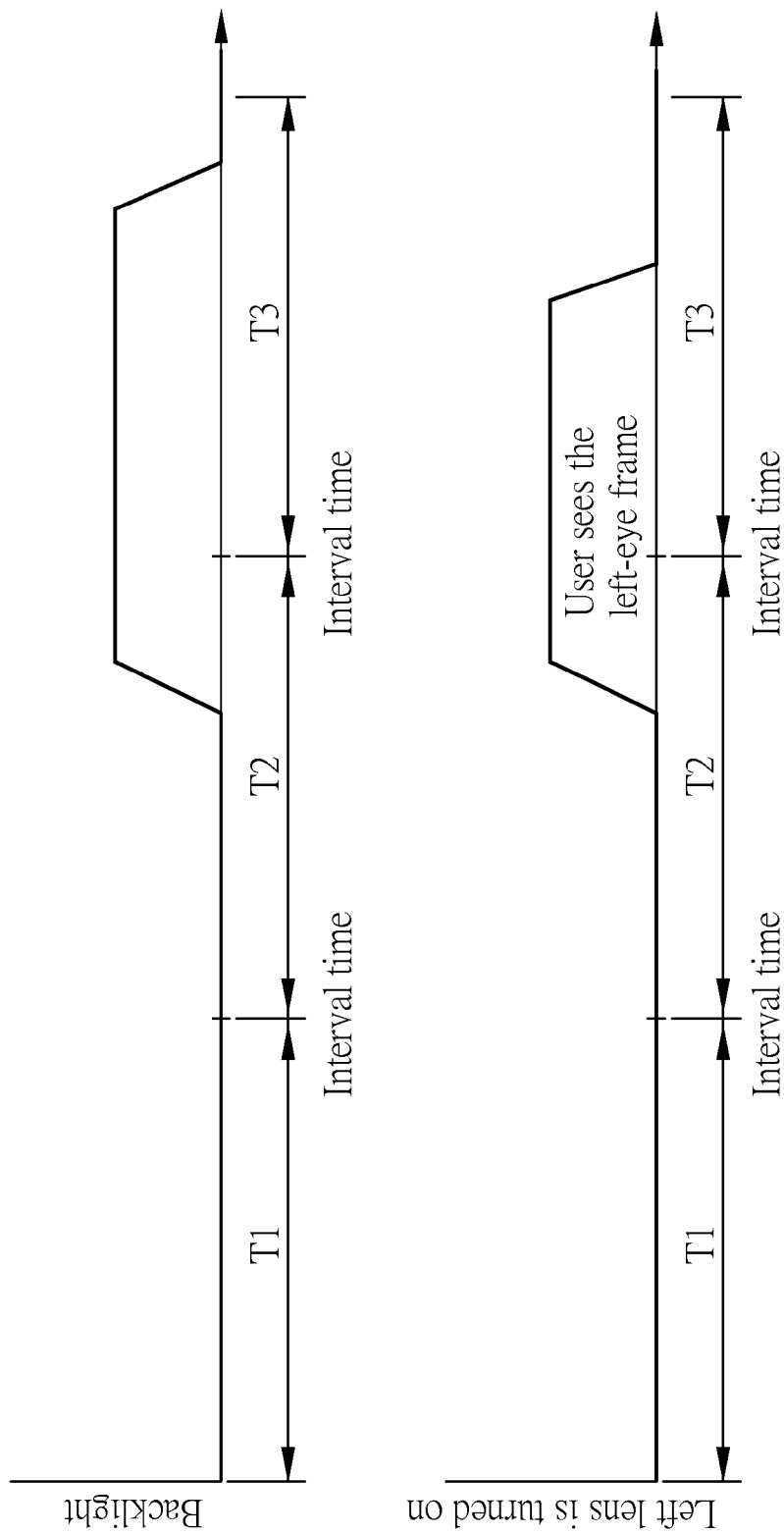
FIG. 3(C) schematically illustrates a second operating status of the backlight module and the pair of shutter glasses corresponding to time t1 to t24 according to the second operating method of the first structure.

Besides, in another embodiment, the left or right lens and the backlight module 20 can be turned on at the same time, as shown in FIG. 3(C). However, it is noted that the left lens or the right lens still has to be turned off before the backlight module 20 is turned off.

Figure 3D:
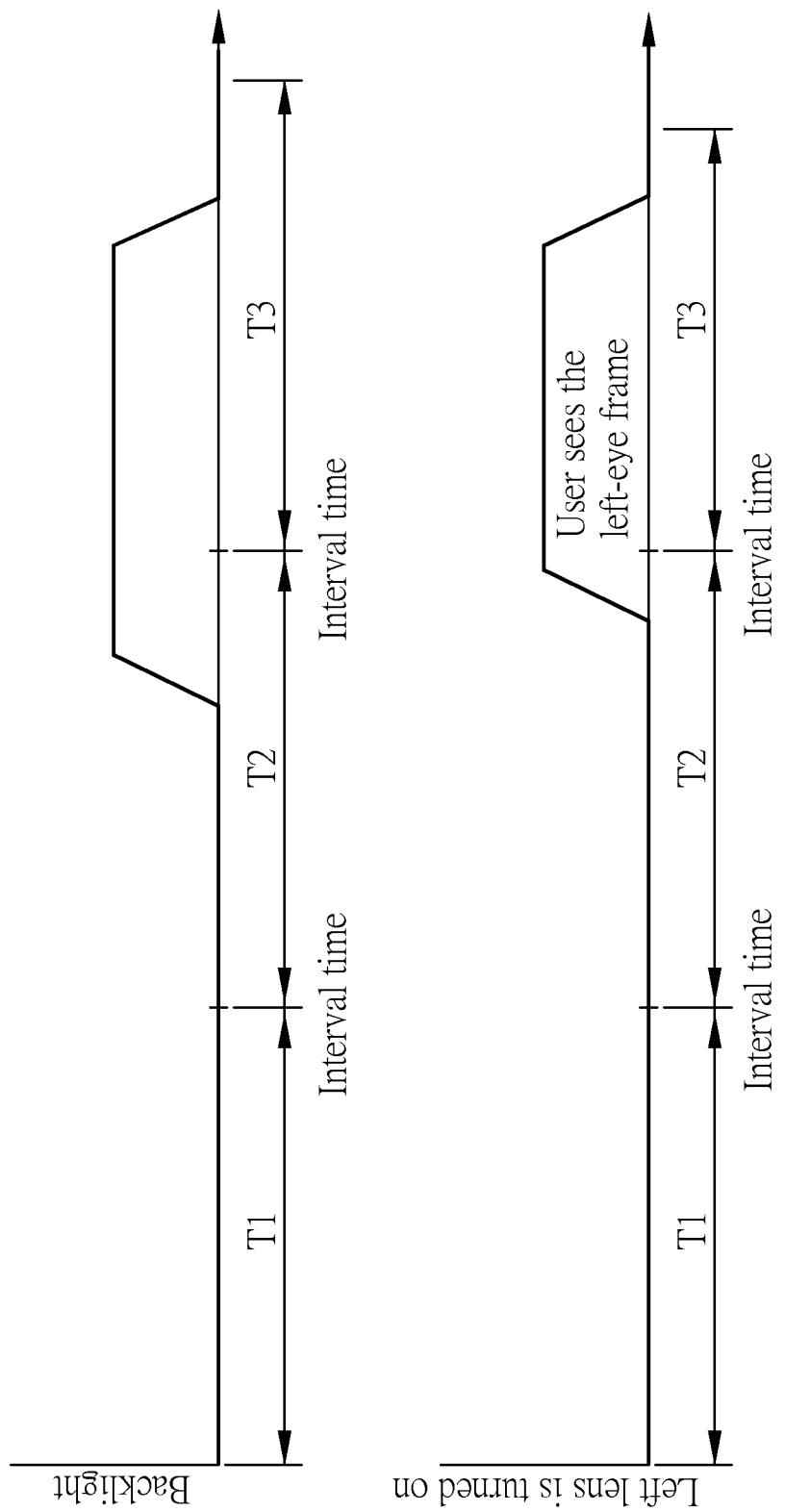
FIG. 3(D) schematically illustrates a third operating status of the backlight module and the pair of shutter glasses corresponding to time t1 to t24 according to the second operating method of the first structure.

Moreover, in still another embodiment, the left or right lens and the backlight module 20 are turned off at the same time, as shown in FIG. 3(D), and it is noted that the left lens or the right lens still has to be turned on after the backlight module 20 is turned on. However, in further another embodiment, the left or right lens and the backlight module 20 are turned on and turned off at the same time.

Figure 4A:
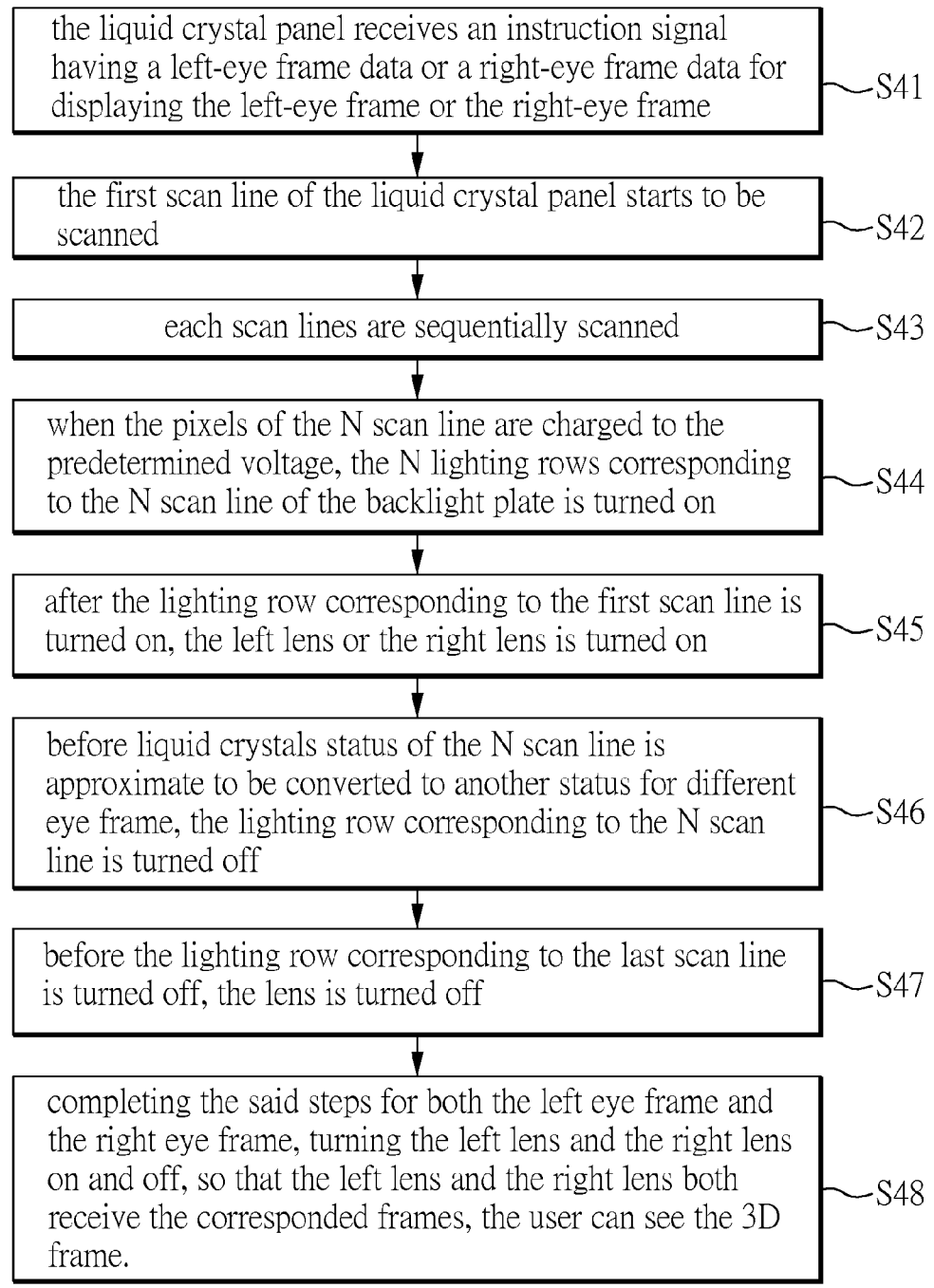
FIG. 4(A) is a flow chart of a third operating method in the first structure.

FIG. 4(A) is a flow chart of a third operating method for improving the slow backlight response of the 3D image frame in the first structure of the invention. The method is executed by the system 1 of FIG. 1(A). At first, step S41 is executed, in which the liquid crystal panel 10 receives a left-eye frame data signal or a right-eye frame data signal; i.e., the liquid crystal panel 10 receives an enable instruction and a left-eye frame data signal or a right-eye frame data signal for displaying, and the plurality of lighting bars of the backlight module 20 are sequentially turned on. Then, step S42 is executed to start scanning the first scan line of the liquid crystal panel 10. Next, step S43 is executed, in which the scan lines are sequentially scanned. Then, step S44 is executed, in which, when the pixels of the N-th scan line are charged to predetermined voltages, the lighting bar corresponding to the N-th scan line of the backlight module 20 is turned on, where N is a positive integer. Next, step S45 is executed, in which, during a time period after the lighting bar corresponding to the first scan line is turned on, the left lens or the right lens is turned on. That is to say, the lens is turned on after the backlight module 20 is turned on, so that left eye or right eye of the user can receive the left-eye frame or the right-eye frame. Next, S46 is executed, before liquid crystals status of the N-th scan line is almost transited to another status for the frame of different eye, the lighting bar corresponding to the N-th scan line is turned off. Next, S47 is executed, in which, before the lighting bar corresponding to the last scan line is turned off, the lens is turned off. Finally, step S48 is executed, in which the system 1 completes the scanning of the frame of the other eye and thus turns on and off the lens of the other eye according to the aforementioned steps. When the left lens and the right lens both receive the corresponding frame, the user can see a 3D image frame.

Figure 4B:
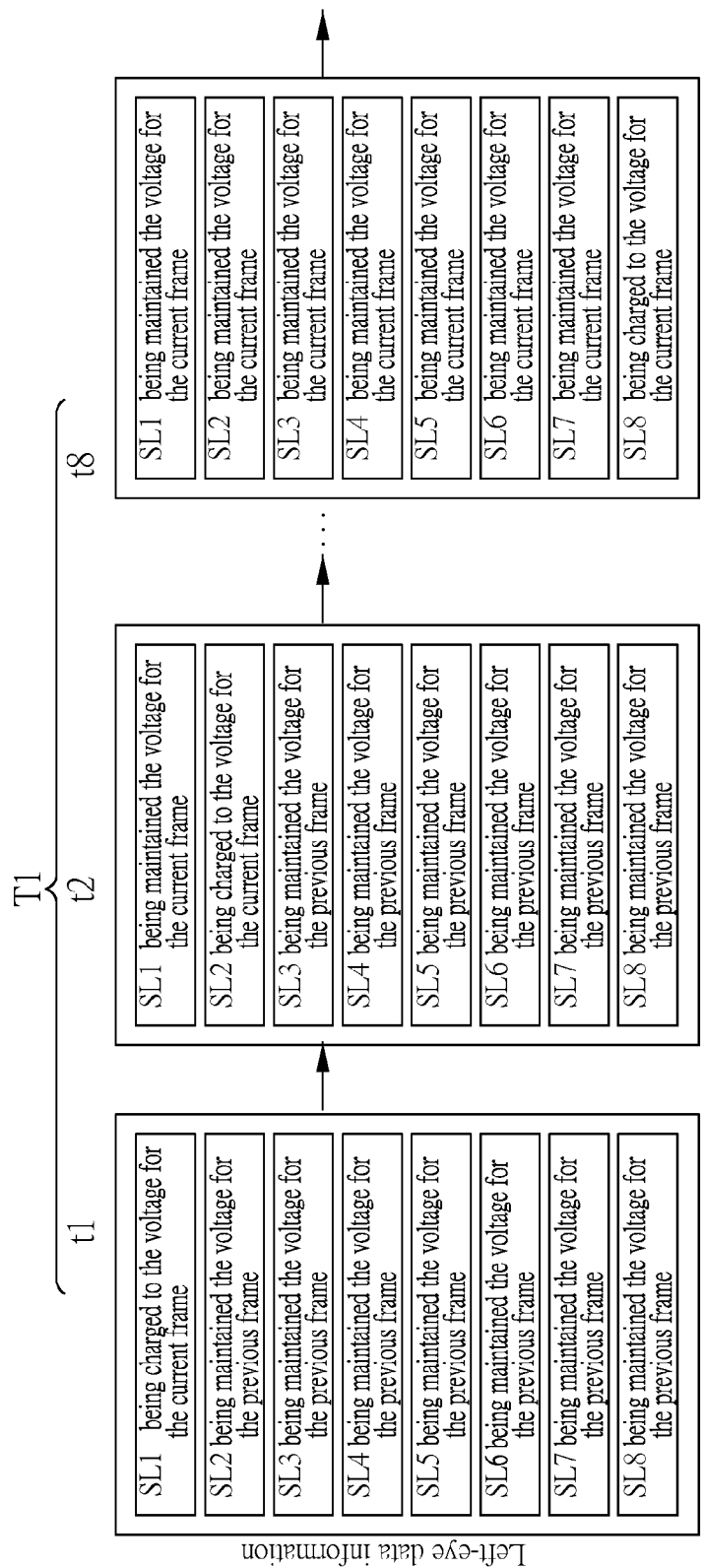
FIG. 4(B) schematically illustrates operating statuses of the liquid crystal panel of the first structure in time t1 to t8.
Figure 4C:
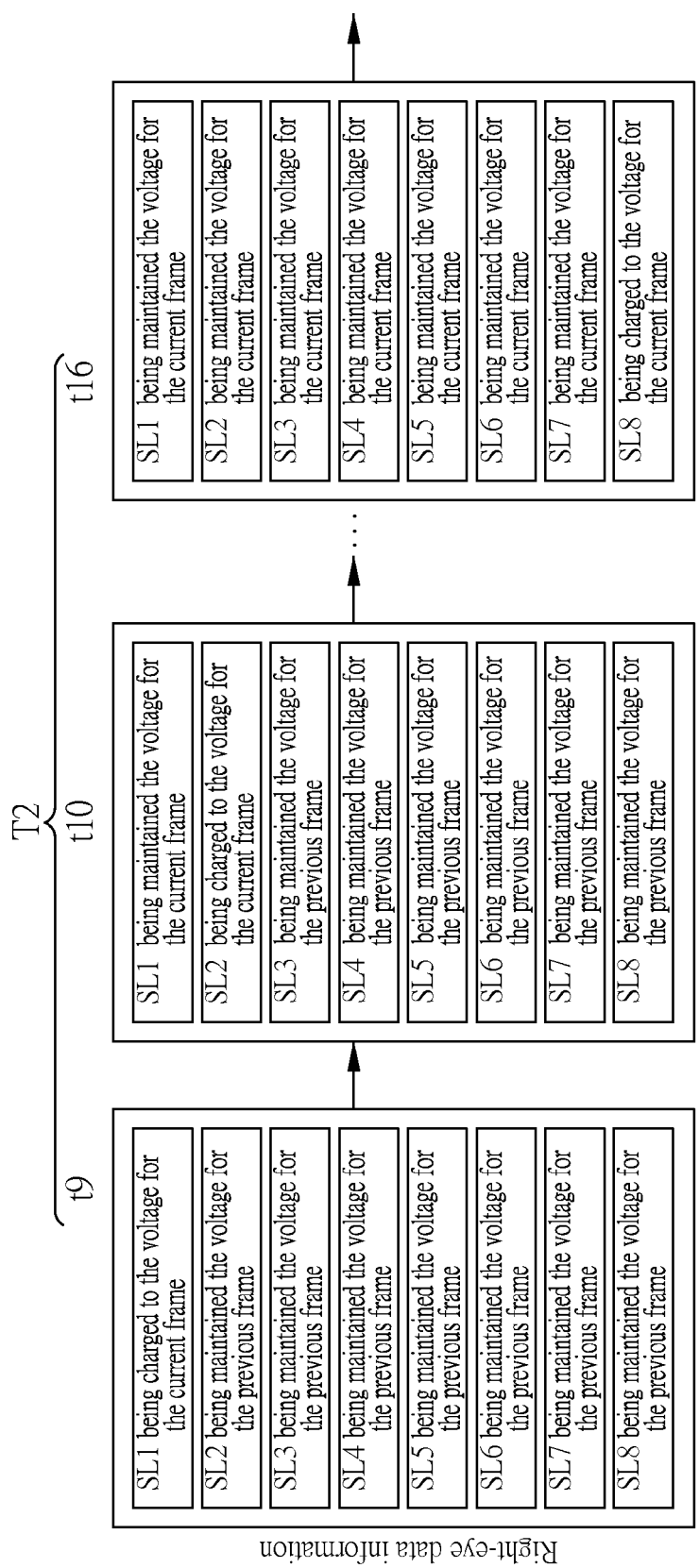
FIG. 4(C) schematically illustrates operating statuses of the liquid crystal panel of the first structure in time t9 to t16.
Figure 4D:
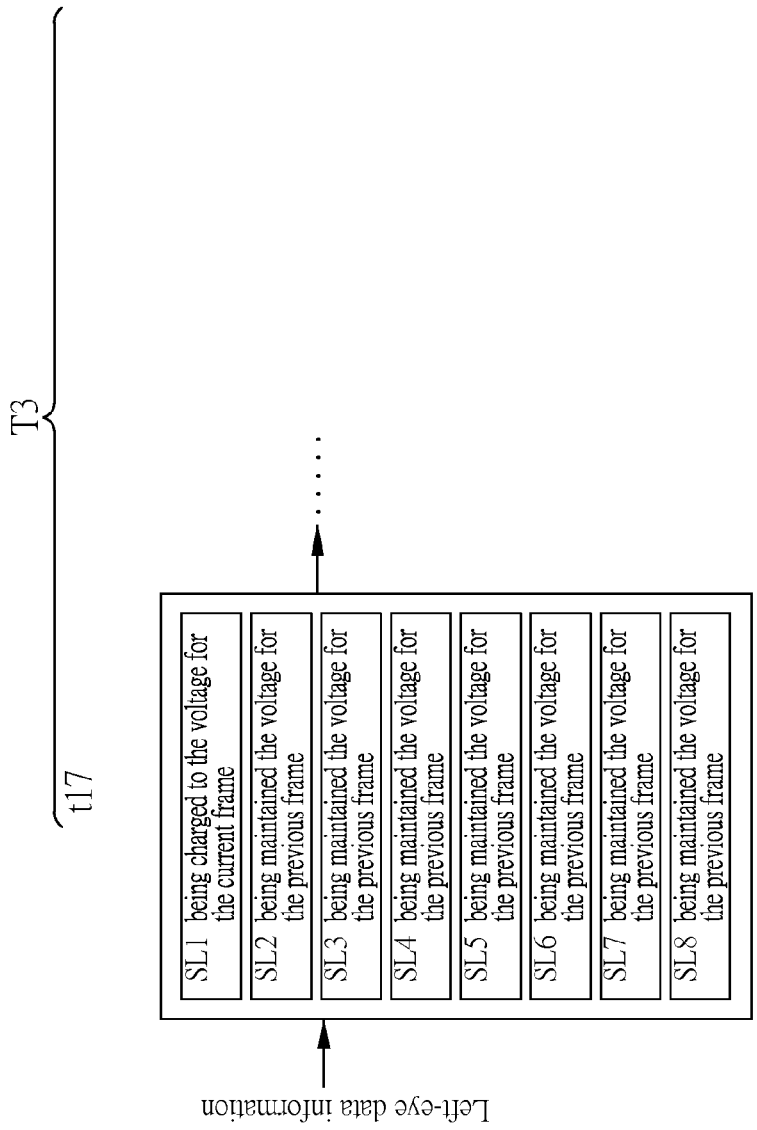
FIG. 4(D) schematically illustrates operating statuses of the liquid crystal panel of the first structure in time t17.

FIGS. 4(B) to 4(D) schematically illustrate detailed operation of steps S41 to S47 in FIG. 4(A). With reference to FIG. 4(A) to FIG. 4(D), this embodiment is similar to the previous embodiment except that each scan line in this embodiment is charged only one time, and the lighting bars on the backlight module 20 are not turned on at the same time. In time period T1, the scan lines SL1 to SL8 of the liquid crystal panel 10 are scanned for the left-eye frame, wherein the time period T1 is preferred to be about 8.333 ms and is equally divided into time t1 to time t8, each corresponding to one scan line being scanned. As shown in FIG. 4(B), in time t1, it starts to scan the first scan line SL1; in time t8, the pixels on the first scan line SL1 have been charged to predetermined voltages so as to display the frame data. At this moment, the controller 40 controls the first lighting bar of the backlight module 20 to be turned on and, after the lighting bar is turned on, the controller 40 turns on the left lens of the pair of shutter glasses 30. In time t9, it starts to charge the first scan line SL1 for the right-eye frame. In time t16, before liquid crystal status of the last scan line SL8 is transited from the left-eye frame to the right-eye frame, the controller 40 turns off the left lens of the pair of shutter glasses 30 and, after the left lens is turned off, the controller 40 turns off the lighting bar corresponding to last scan line SL8. The left lens or the right lens is turned on for a time period which is 0.5 to 0.9 times as a time period for forming image in the left-eye frame or the right-eye frame, and the backlight module 20 is turned on for a time period which is 0.35 to 1 times as a time period for forming image in the left-eye frame of the right-eye frame. It is noted that the scanning for forming image in the left-eye frame or the right-eye frame in this embodiment is not a frequency multiplication design; i.e., the left-eye frame or the right-eye frame is formed by scanning only one time, so that the time of forming image is one frame time.

Figure 4E:
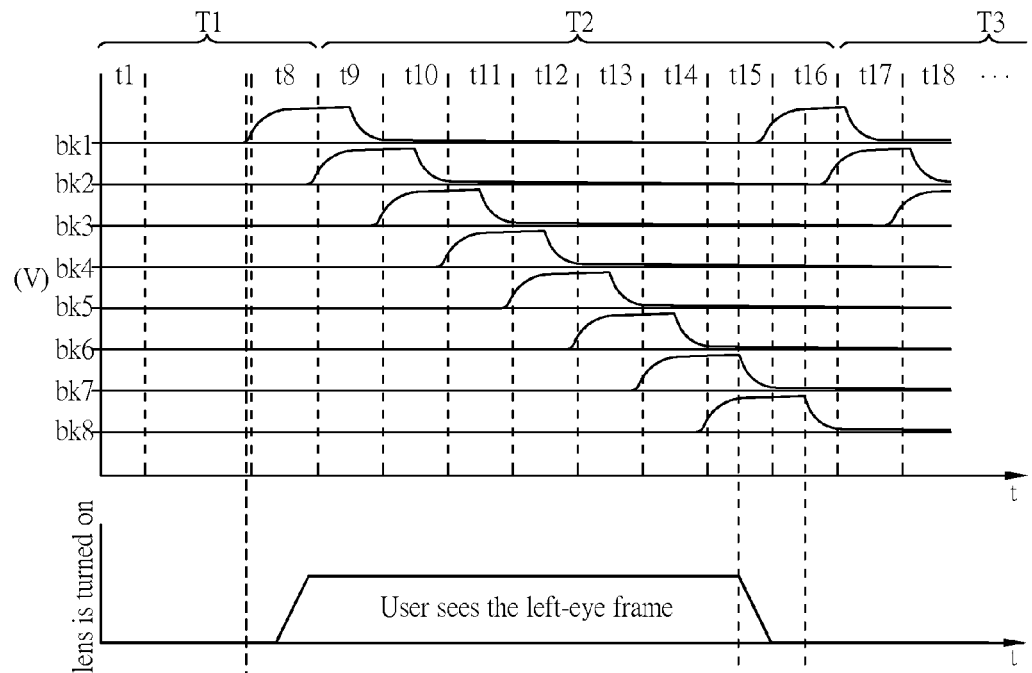
FIG. 4(E) schematically illustrates a first operating status of the backlight module and the pair of shutter glasses corresponding to time t1 to t17 in accordance with the third operating method of the first structure.
Figure 4F:
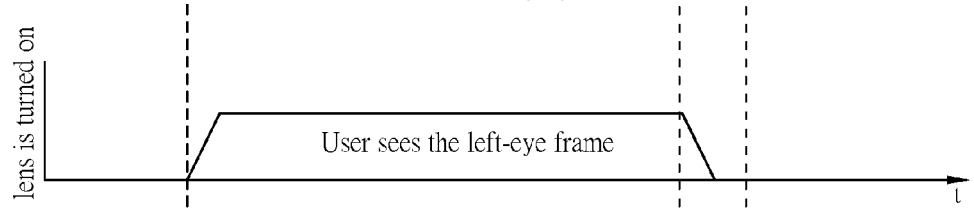
FIG. 4(F) schematically illustrates a second operating status of the backlight module and the pair of shutter glasses corresponding to time t1 to t17 in accordance with the third operating method of the first structure.

Besides, the lens is turned on after the backlight module 20 is turned on, and the lens is turned off before the backlight module 20 is turned off, as shown in FIG. 4(E). Further, in another embodiment, the lens and the backlight module 20 can be turned on at the same time, as shown in FIG. 4(F). However, it is noted that the lens should be turned off before the backlight module is turned off.

Figure 4G:
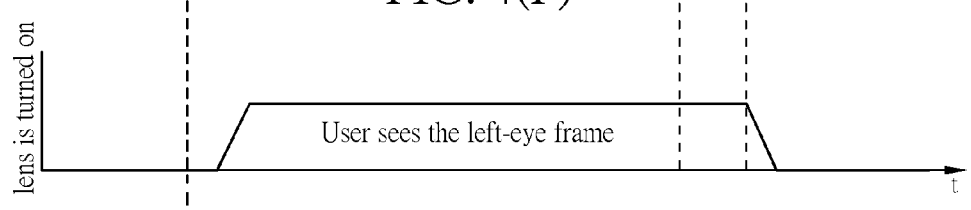
FIG. 4(G) schematically illustrates a third operating status of the backlight module and the pair of shutter glasses corresponding to time t1 to t17 in accordance with the third operating method of the first structure.

In still another embodiment, the lens and the backlight module 20 can be turned off at the same time, as shown in FIG. 4(G), and it is noted that the lens should be turned on after the backlight module being turned on. However, in further another embodiment, the lens and the backlight module 20 can be turned on and turned off at the same time.

Therefore, it is known that the lens of the pair of shutter glasses is turned on after the backlight module 20 is turned on, or the lens of the pair of shutter glasses is turned off before the backlight module 20 is turned off, so as to allow the user to see a 3D image of high color purity without image crosstalk caused by the slow back light response.

Figure 5:
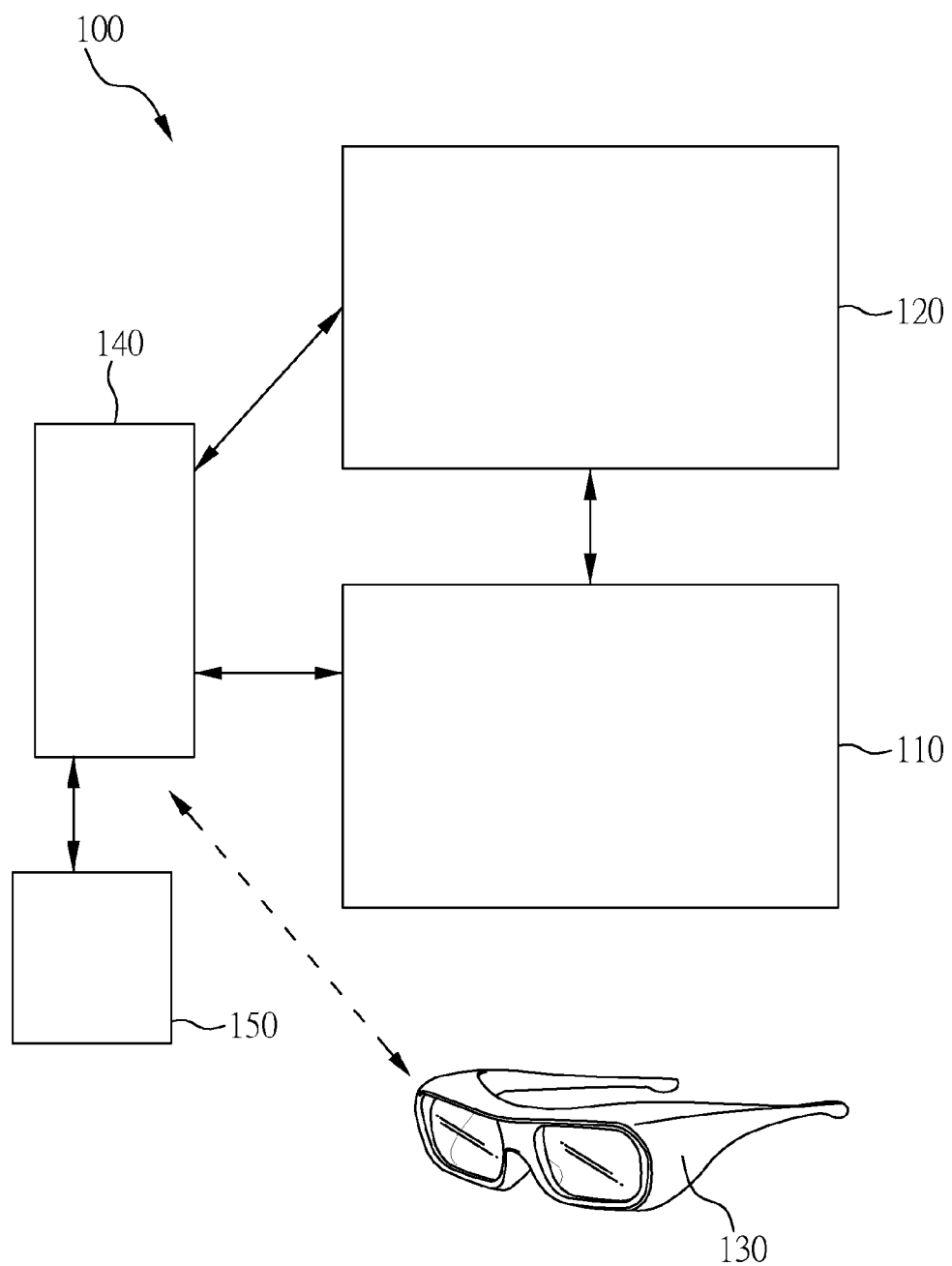
FIG. 5 schematically illustrates a second structure of a 3D image frame display system according the embodiment.

FIG. 5 schematically illustrates a second structure of a 3D image frame display system 100 according an embodiment of the invention. The 3D image frame display system 100 includes a liquid crystal panel 110, a backlight module 120, a pair of shutter glasses 130 including a first lens (a left-eye lens) and a second lens (a right-eye lens), a controller 140 and a display removing control unit 150, wherein the function of the liquid crystal panel 110, the backlight module 120, pair of shutter glasses 130 and the controller 140 are the same as that of the first structure of the invention, and thus a detailed description therefor is deemed unnecessary. This second structure is provided with the display removing control unit 150, which is preferably a black insertion or gray insertion control unit 150. The display removing control unit 150 can be a circuit device connected to controller 140, or can be arranged in the controller 140. The display removing control unit 150 is used to transmit a display removing signal to the liquid crystal panel 110 to generate a display removing frame, which is preferably a black frame or a gray frame.

The 3D image frame displayed by the 3D image frame display system is composed by at least a first 3D image including a first display frame and a second display frame. Preferably, the first display frame is a left-eye frame or a right-eye frame, and the second display frame is a right-eye frame or a left-eye frame.

The display removing frames is black frame or gray frame different from the left-eye frame and the right-eye frame. That is to say, when the display removing frames is generated, there is no 3D image frame data displayed on the liquid crystal panel 110 If a range of gray level value is 0 to 255, the gray level value of the gray frame is preferred to be 10 to 20; i.e., the gray level value of the gray insertion is 4~8% of the total gray level value.

The display frequency of the liquid crystal panel 110 is preferred to be higher than 180 Hz.

In some embodiments, similar to the first structure of the invention and with reference to FIG. 1(B) again, the backlight module 20 of the second structure also includes three light source groups, each light source group with one color, and each light source group includes a plurality of light sources, and a difference in rising time between lighting waveforms or a difference in falling time between lighting waveforms of at least two different color light sources is bigger than 1 millisecond(msec). For example, as shown in FIG. 1(B), a first color light source 21 has a rising time Tr1 and a falling time Tf1, and a second color light source 22 has a rising time Tr2 and a falling time Tf2. When a difference Tr1−Tr2 in the rising time of the two color light sources or a difference Tf1−Tf2 in the falling time between the two color light sources is bigger than 1 msec, by the system in the invention, the better 3D image effect can be provided.

Figure 6A:
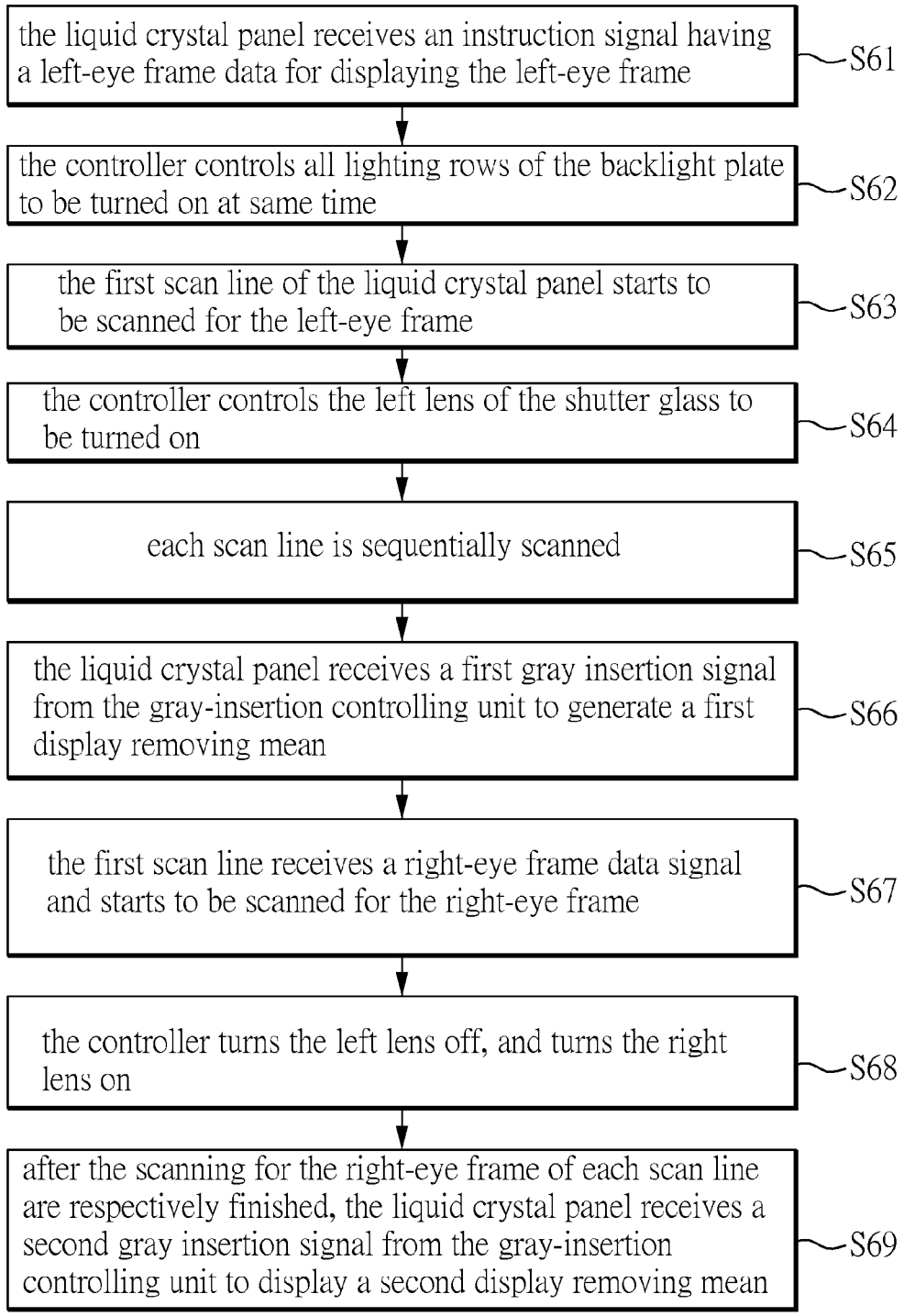
FIG. 6(A) is a flow chart of an operating method in the second structure.

FIG. 6(A) is a flow chart of an operating method for improving the slow backlight response of the 3D image frame in the second structure of the invention. This method is executed by the 3D image frame display system 1. At first, step S61 is executed, in which the liquid crystal panel 100 receives a left-eye frame data signal. Then, step S62 is executed, in which, when receiving the signal, the controller 140 controls all lighting bars of the backlight module 120 to be turned on at the same time. Next, step S63 is executed to start scanning the first scan line SL1 of the liquid crystal panel 100. Next, step S64 is executed, in which the controller 40 controls the left lens of the pair of shutter glasses 30 to be turned on. Next, step S65 is executed to sequentially scan each scan line until the last scan line, so that the pixels on each scan line can be respectively charged to a predetermined voltage. Next, step S66 is executed, in which the liquid crystal panel 100 receives a first display removing signal from the display removing control unit 150 so as to generate a first display removing frames. Preferably, the first display removing signal is a black insertion signal or a gray insertion signal, and the first display removing frames is a black frame or a gray frame used to eliminate the remained image of the left-eye frame due to the slow backlight response. Thus, the first display removing frames can be regarded to correspond to the left-eye frame. Next, step S67 is executed, in which the first scan line SL1 receives a right-eye frame data signal and it starts scanning for the right-eye frame. Next, step S68 is executed, in which the controller 40 turns off the left lens, and turns on the right lens. Finally, step S69 is executed, in which, after the pixels on each scan line are respectively charged to predetermined voltages, the liquid crystal panel 100 receives a second display removing signal from the display removing control unit 150 so as to display a second display removing mechanism. Preferably, the second display removing frames is a black insertion signal or a gray insertion signal, and the second display removing frames is a black or gray frame used to eliminate the remained image of the right-eye frame. Thus, the second display removing frames can be regarded to correspond to the right-eye frame. When each of the left lens and the right lens receives a corresponding frame, the user can see a 3D image. Because a black frame or a gray frame is inserted in the liquid crystal panel 100 after the left-eye frame or the right-eye frame has been displayed, the remained image of the left-eye frame or the right-eye frame has been eliminated when switching to turn on the right lens or the left lens.

Although the left-eye frame is generated before the right-eye frame is generated, as shown in FIG. 6(A), it is also applicable that the right-eye frame is generated before the left-eye frame is generated.

It is noted that, in this embodiment, the backlight module 120 is continuously turned on, so that the backlight module 120 will not encounter the problem of slow backlight response. However, in other embodiments, the backlight module 120 can be turned off when the black frame or gray frame is inserted, which may cause the problem of slow backlight response. Because of inserting the black frame or the gray frame, the remained image of the old frame can be eliminated by the inserted black frame or gray frame.

Figure 6B:
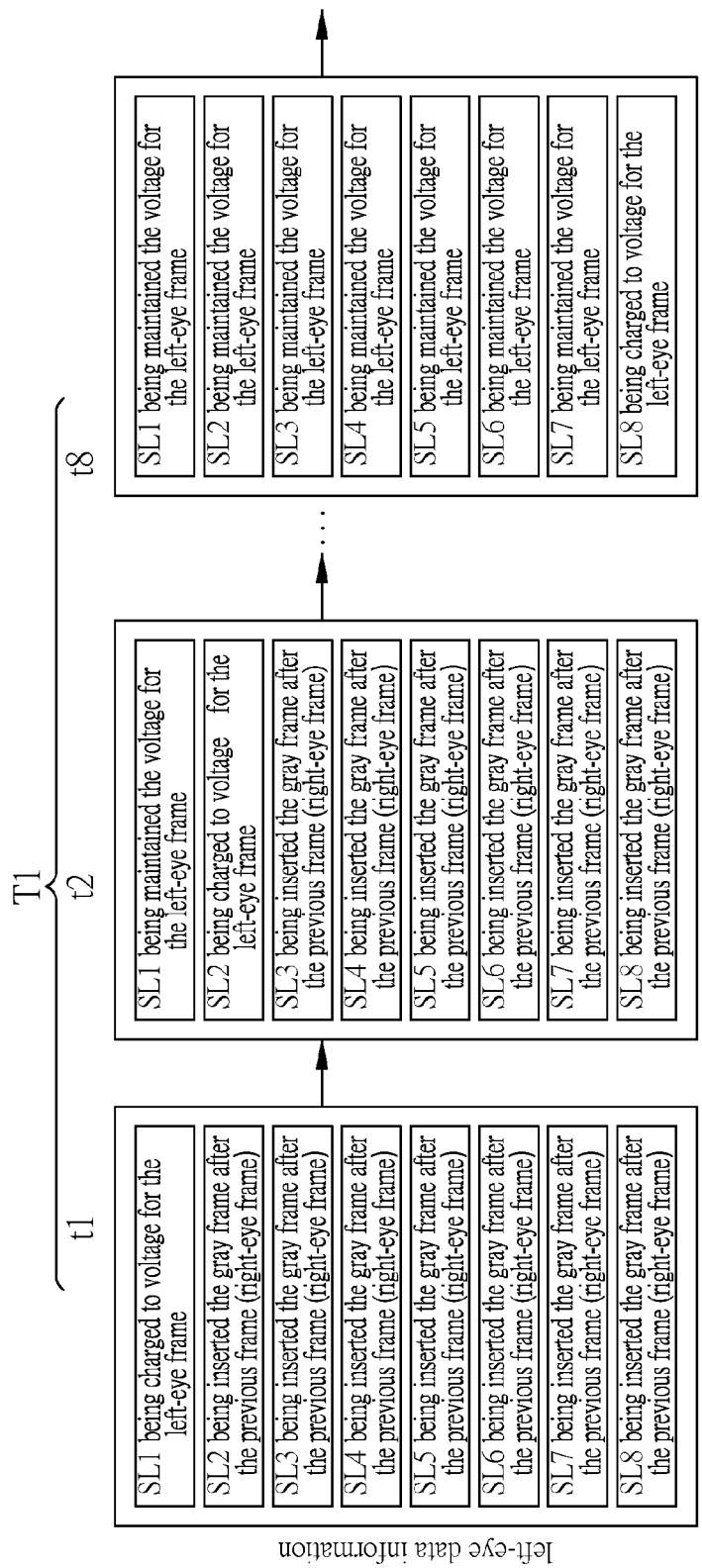
FIG. 6(B) schematically illustrates operating statuses of the liquid crystal panel of the second structure corresponding to time t1 to t8.

FIGS. 6(B) to 6(F) schematically illustrate the detailed operating flow of FIG. 6(A). For clear description, the number of scan lines SL1 to SL8 of the liquid crystal panel 100 is configured to be eight, and it is assumed that the left-eye frame is displayed before the right-eye frame is displayed and the display removing frames to be inserted is a gray frame. As shown in FIG. 6(B), in time t1, the liquid crystal panel 100 receives an instruction signal for displaying the left-eye frame, so as to start charging pixels of the first scan line SL1. At this moment, the second scan line SL2 to the last scan line SL8 are provided with gray insertion data that was inserted when displaying a previous right-eye frame. In time t2, it starts to charge the second scan line SL2, and the first scan line SL1 maintains the voltage; i.e., the first scan line SL1 starts to display the left-eye frame data. In time t3 to time t8, it continues to charge the third to last scan lines SL3 to SL8, respectively.

Figure 6C:
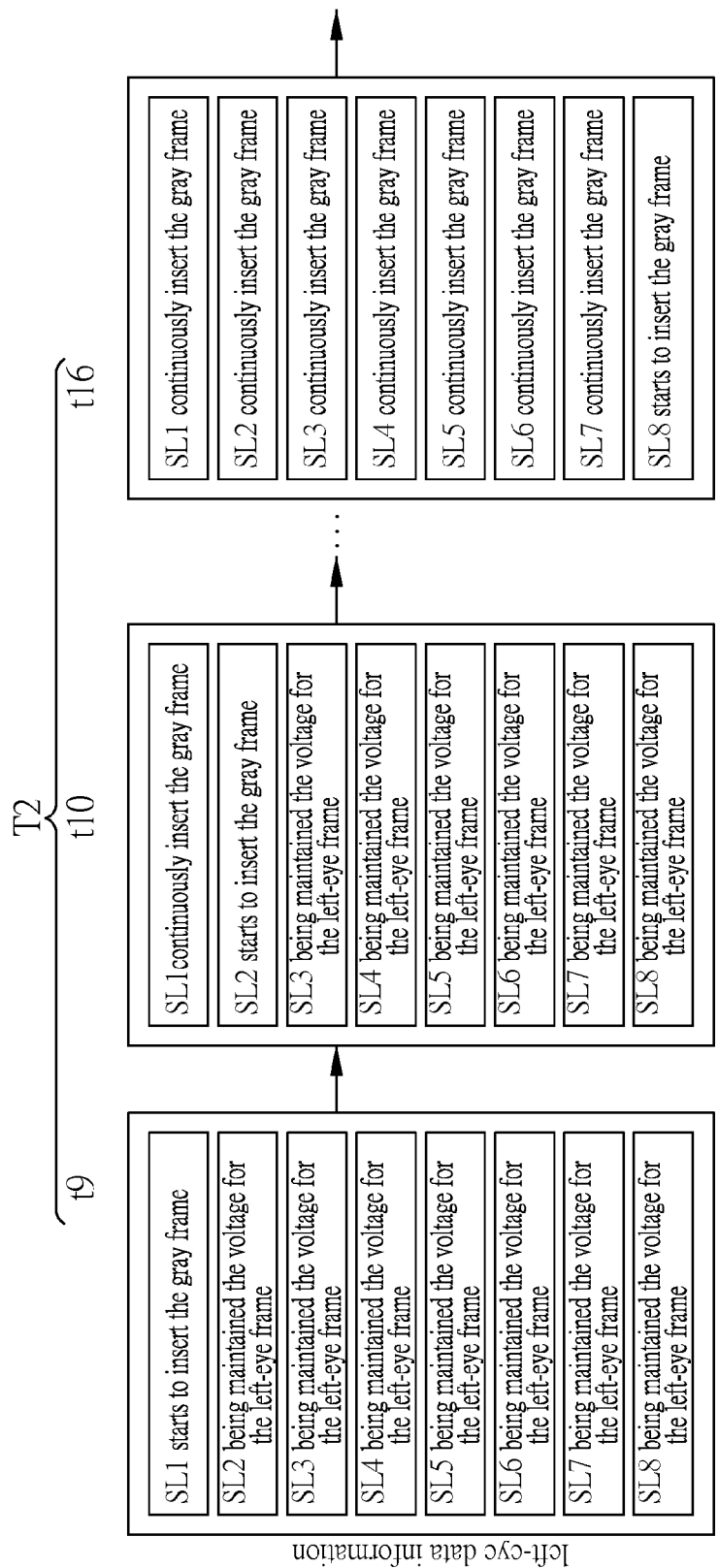
FIG. 6(C) schematically illustrates operating statuses of the liquid crystal panel of the second structure corresponding to time t9 to t16.

As shown in FIG. 6(C), in time t9, the first scan line SL1 receives a first gray insertion signal for switching display of the left-eye frame data to display of the first gray frame data. At this moment, the other scan lines SL2 to SL8 maintain the voltages (for displaying the left-eye frame data). In time t10 to time t16, the other scan lines SL2 to SL8 are sequentially switched to display the first gray frame.

Figure 6D:
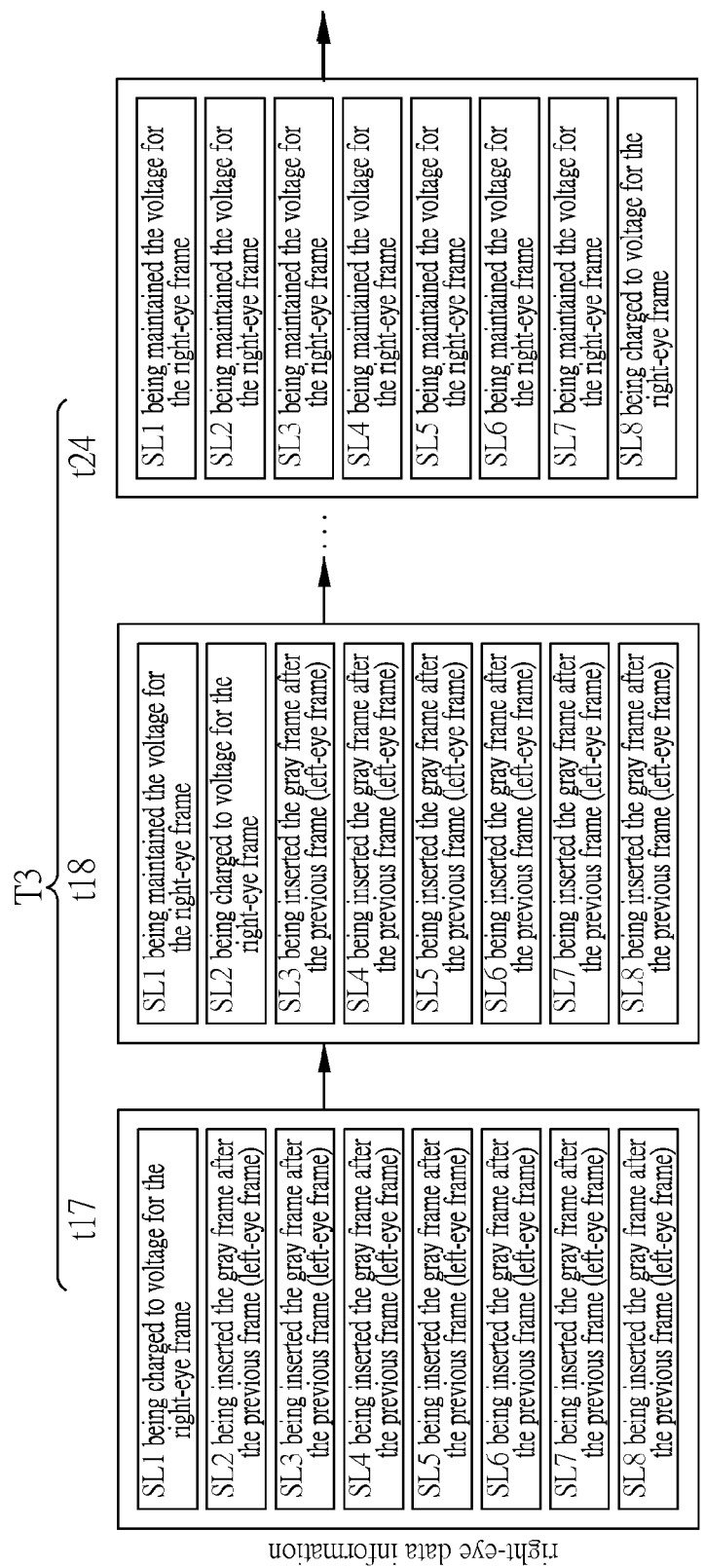
FIG. 6(D) schematically illustrates operating statuses of the liquid crystal panel of the second structure corresponding to time t17 to t24.

As shown in FIG. 6(D), in time t17, the liquid crystal panel 100 receives an instruction signal of displaying the right-eye frame, so as to start scan the first scan line SL1 for the right-eye frame. It is noted that, at this moment, the second scan line SL2 to the last scan line SL8 are provided with the first gray frame data. In time t18 to time t24, the scan lines SL2 to SL8 are sequentially charged for displaying the right-eye frame.

Figure 6E:
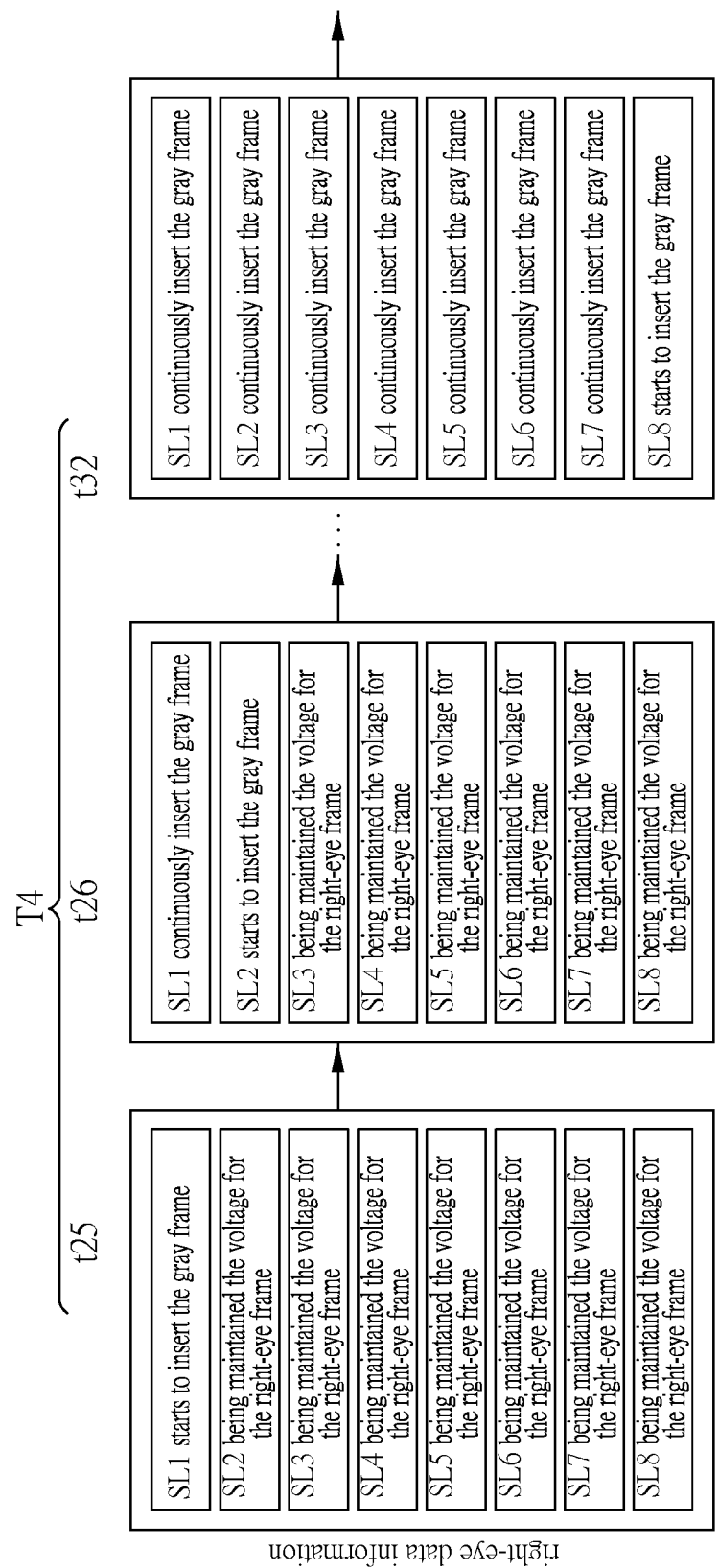
FIG. 6(E) schematically illustrates operating statuses of the liquid crystal panel of the second structure corresponding to time t25 to t32.

As shown in FIG. 6(E), in time t25, the first scan line SL1 receives a second gray insertion signal, so as to switch display of the right-eye frame data to display of the second gray frame data. At this moment, the scan lines SL2 to SL8 still maintain the voltages (for displaying the right-eye frame data). In time t26 to time t32, the scan lines SL2 to SL8 are sequentially switched to display the second gray frame data. As a result, a 3D image frame can be formed.

It is noted that this embodiment is characterized in that the first gray frame is inserted after the left-eye frame is displayed. Thus, before the liquid crystal panel 100 displays the right-eye frame, the remained image of the left-eye frame can be eliminated by the first gray frame. Further, the second gray frame is inserted after the right-eye frame is displayed and thus, before the liquid crystal panel 100 is switched back to display a left-eye frame of a next 3D image frame, the remained image of the right-eye frame of the current 3D image frame is eliminated by the second gray frame.

Figure 6F:
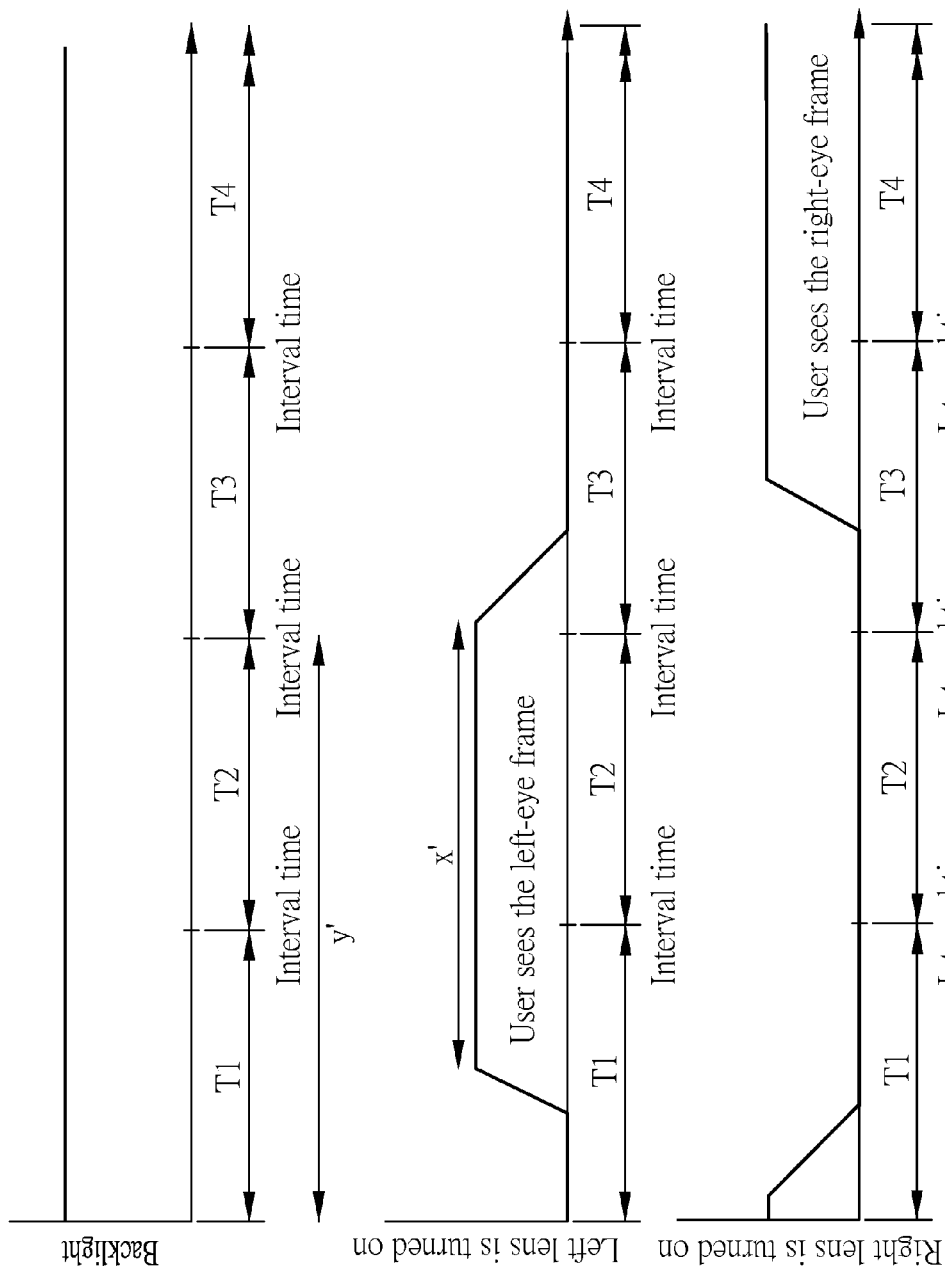
FIG. 6(F) schematically illustrates a first operating status of the backlight module and the pair of shutter glasses of the second structure corresponding to time t1 to t24.

FIG. 6(F) is a schematic diagram of the pair of shutter glasses 130 operating in time periods T1 to T4 (i.e. in time t1 to time t32). In this embodiment, the backlight module 120 is preferred but not limited to be continuously turned on. The left lens is turned on during the time period T1, and it is preferred to be turned on at the end of the time period T1. Due to that the pixels on each scan line have to be charged to predetermined voltages for displaying the image of corresponding frame data, the frame is actually displayed after starting to scan the scan lines, so that the actual time that the user can see the left-eye frame is after the time period T1 starts and before the time period T2 ends. The left lens is preferred to be turned off in the time period T3, e.g. after the time t17 (i.e. after starting to scan the first scan line SL1 for the right-eye frame) for ensuring that the remained image of the left-eye frame displayed by the last scan line SL8 is completely eliminated by the first gray frame. After the left lens is turned off, the right lens is turned on and, similar to the left lens, the right lens is turned off when starting to charge the first scan line for displaying the next left-eye frame, whereby the remained image of the right-eye frame can be eliminated by the second gray frame.

The left lens is turned on for a time period which is 1 to 1.2 times as a time period for forming images in the left-eye frame and the first insertion frame.

Beside, although the backlight module is continuously turned on in this embodiment, the backlight module can also be turned off and, preferably, the backlight module is turned on for a time period which is longer than that the left lens is turned on.

Figure 7:
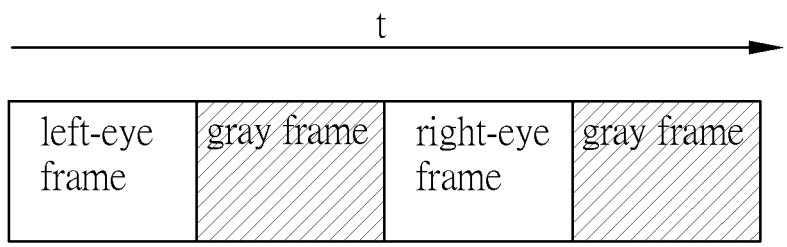
FIG. 7 schematically illustrates a display operation of the 3D image frame viewed by the user.

FIG. 7 schematically illustrates a display operation of the 3D image frame viewed by the user, wherein the gray frame is inserted after the left-eye frame or the right-eye frame is displayed.

In general, the 3D image frame display system 1 continuously displays a plurality of 3D image frames (i.e. a plurality of left-eye frames and right-eye frames), and thus the display of a plurality of 3D image frames will be described hereinafter. Because the liquid crystal panel 100 has a plurality of pixels, one of the pixels is taken as an example for clear description.

When the pixel is required to display gray level value of the left-eye frame data (a signal of the left-eye frame) or the right-eye frame data (a signal of the right-eye frame), the controller 140 transmits a gray level voltage to the pixel. The gray level voltage corresponds to a gray level value, and the pixel generates a corresponding gray level value according to the gray level value. In general, the liquid crystal panel has a positive frame stage and a negative frame stage occurred alternately, so that the gray level voltage corresponding to the same gray level value in the positive frame stage differs from and the gray level voltage corresponding to the same gray level value in the negative frame stage, wherein the difference between the gray level voltage in the positive frame stage and the gray level voltage in the negative frame stage is a gray level voltage range. For example, if there are 255 gray level values, the gray level voltage in the negative frame stage is 0.5V, and the gray level voltage in the positive frame stage is 15.5V, such that the gray level voltage range of 255 gray level values is 15V.

Figure 8A:
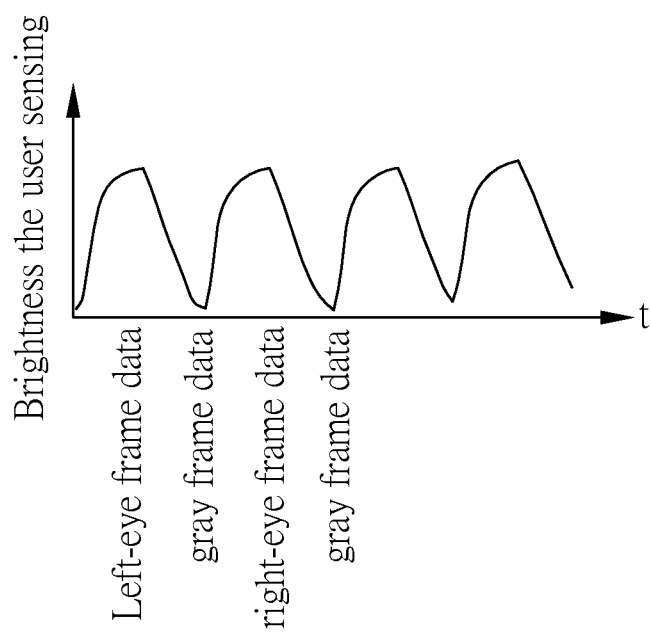
FIG. 8(A) is a timing diagram showing change of gray level value of a pixel when displaying a first 3D image.

FIG. 8(A) is a timing diagram showing change of gray level value of a pixel when displaying a first 3D image on the liquid panel 100. The brightness value of the pixel for displaying the left-eye frame is the same as the brightness value of the pixel for displaying the right-eye frame. That is, the gray level voltage received by the pixel for displaying the left-eye frame is the same as the gray level voltage received by the pixel for displaying the right-eye frame. For example, the pixel displays a white signal when displaying either the left-eye frame or the right-eye frame, wherein the white signal is used to enable the pixel to have the maximum brightness value.

It is noted that, when the pixel receives the gray level voltage for displaying the white signal, the liquid crystal panel is Vertical Aligned (VA) type. If the liquid crystal panel is Twist Nematic (TN) type, the liquid crystal panel receives the gray level voltage for displaying a black signal. In other words, for the VA liquid crystal panel, the white signal is used to enable the pixel to have the maximum brightness and, for TN liquid crystal panel, the black signal is used to enable the pixel to have the minimum brightness. For clear description, the VA liquid crystal panel is taken as an example for illustration hereinafter.

Figure 8B:
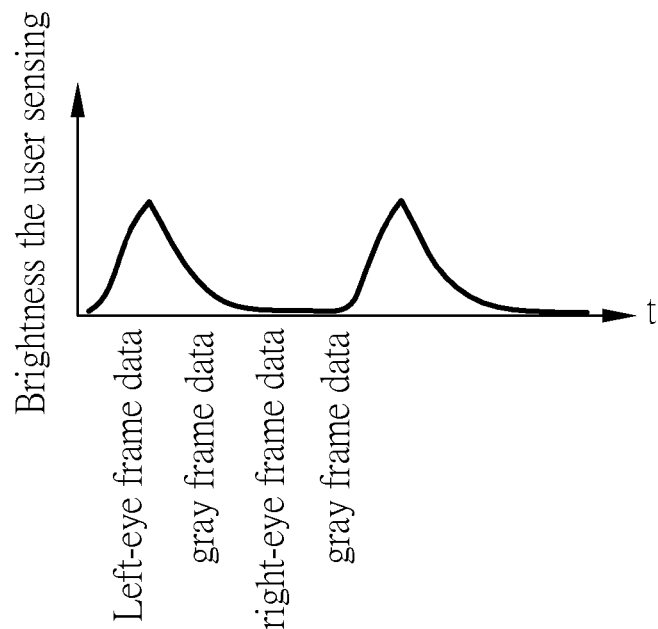
FIG. 8(B) is a timing diagram showing change of gray level value of the pixel when displaying a second 3D image.

FIG. 8(B) is timing diagram showing change of gray level value of a pixel when displaying a second 3D image including a third display frame (e.g. a left-eye frame) and a forth display frame (e.g. a right-eye frame) on the liquid panel 100. The brightness value of the pixel for displaying the left-eye frame is different from the brightness value of the pixel for displaying the right-eye frame. That is, the gray level voltage received by the pixel for displaying the left-eye frame is different from the gray level voltage received by the pixel for displaying the right-eye frame. For example, the pixel displays a white signal in the left-eye frame when displaying the left-eye frame, and displays a black signal in the right-eye frame when displaying the right-eye frame. When the display removing frames (black or gray frame) is inserted between the left-eye frame and the right-eye frame, the brightness sensed by the user is lower than expected value. That is, the gray level voltage received by the pixel for displaying the signal of the left-eye frame (white signal) cannot reach to a predetermined voltage, resulting in that the brightness of the white signal is decreased.

Figure 8C:
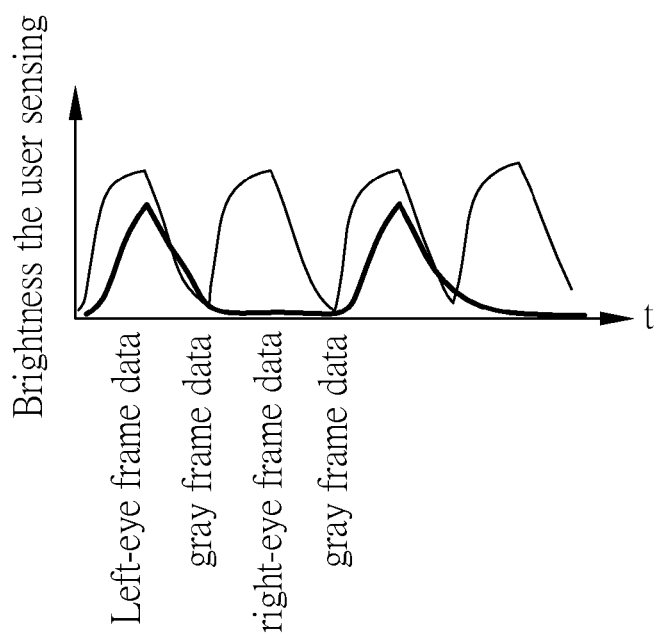
FIG. 8(C) is a timing diagram showing a comparison between gray level values of the pixel when displaying the first 3D image frame and the second 3D image frame.

FIG. 8(C) is a timing diagram showing a comparison between gray level values of the pixel when displaying the first 3D image frame and the second 3D image frame. Because the black frame or the gray frame is inserted, the brightness of the pixel for displaying a white signal in the second 3D image frame is lower than the brightness of the pixel for displaying the white signal in the first 3D image frame. Therefore, when display of the pixel of the second 3D image frame is switched from the display removing frames (black or white frame) to the white signal, a slow response problem of the liquid crystal may be encountered. When display of the liquid crystal panel 100 is switched from the first 3D image frame to the second 3D image frame, the difference in brightness between the two white signals may cause a crosstalk problem.

To avoid the aforementioned problem, preferably, when the pixel displays a white signal in a first display frame of the first 3D image frame, the pixel receives a first positive frame gray level voltage in a positive frame stage or receives a first negative frame gray level voltage in a negative frame stage, and there is a first difference between the first positive frame gray level voltage and the first negative frame gray level voltage. When the pixel displays a white signal in a first display frame of a second 3D image frame, the pixel receives a second positive frame gray level voltage in another positive frame stage or receives a second negative frame gray level voltage in another negative frame stage, and there is a second difference between the second positive frame gray level voltage and the second negative frame gray level voltage, in which the first difference is smaller than the second difference. For example, the gray level voltage of the first positive frame is 16V, the gray level voltage of the first negative voltage is 4V, the first difference is 12V, the gray level voltage of the second positive frame is 17V, the gray level voltage of the second negative frame is 3V, and the second difference is 14V. Thus, the difference in brightness between the white signal in the first 3D image frame and the white signal in the second 3D image frame can be reduced, so as to decrease the crosstalk.

Without being limited to be displayed from the left-eye frame, the white signal of the second 3D image frame also can be displayed from the right-eye frame and, in this case, a difference between the gray level voltage of the positive frame of the right-eye frame and the gray level voltage of the negative frame of the right-eye frame in the second 3D image frame has to be greater than a difference between the gray level voltage of the positive frame of the right-eye frame and the gray level voltage of the negative frame of the right-eye frame in the first 3D image frame.

It is noted that, in the above case, the liquid crystal panel is of VA type. Those skilled in the art can readily understand that the pixel displays a black signal if the liquid crystal panel is of TN type.

Besides, in the second structure of the invention, the display removing frames (black or gray frame) is inserted after the left-eye frame or the right-eye frame is displayed; i.e., the user's left eye receives the black or gray frame after receiving the left-eye frame or the right-eye frame. However, in actual application, the black or gray frame can be inserted before the left-eye frame or the right-eye frame is displayed; i.e., the user's left eye receives the black or gray frame before receiving the left-eye frame.

As a result, by inserting the display removing frames, the user will not see the remained images of different frames resulted from the slow backlight response, so as to solve the problems caused by slow backlight response and crosstalk of the remained images.

Although the present invention has been explained in relation to its preferred embodiment, it is to be understood that many other possible modifications and variations can be made without departing from the spirit and scope of the invention as hereinafter claimed.

What is claimed is:
1. A 3D image frame display system, comprising:
  a liquid crystal panel having a plurality of pixels for displaying a first 3D image, wherein the first 3D image includes a first display frame, a second display frame, a first display removing frame and a second display removing frame; the first display removing frame is inserted between the first display frame and the second display frame, and the second display removing frame is inserted after the second display frame;

a backlight module for providing a light passing through the liquid crystal panel, the light including a plurality of lighting waveforms with different colors, and a difference in rising time or in falling time between lighting waveforms of at least two colors being bigger than 1 millisecond; and a pair of shutter glasses including a first lens and a second lens, wherein the first lens is turned on for passing through the light and turned off for shielding the light from the backlight module for corresponding to the first display frame, and the second lens is turned on for passing through the light and turned off for shielding the light from the backlight module for corresponding to the second display frame wherein, when the pixel displays a white signal in the first display frame, the pixel receives a first positive frame gray voltage in a positive frame stage or a first negative frame voltage in a negative frame stage, and there is a first difference between the first positive frame voltage and the first negative frame voltage; when the pixel displays a white signal in a third display frame, the pixel receives a second positive frame gray voltage in another positive frame stage or a second negative frame gray voltage in another negative frame stage, and there is a second difference between the second positive frame gray voltage and the second negative frame gray voltage, in which the first difference is smaller than the second difference.

2. The 3D image frame display system of claim 1, wherein the liquid crystal panel displays a second 3D image, the second 3D image includes the third display frame corresponding to the first lens and a fourth display frame corresponding to the second lens, a third display removing frame and a fourth display removing frame are alternately inserted in a process of displaying the second 3D image, the third display removing frame is inserted between the third display frame and the fourth display frame, and the fourth display removing frame is inserted after the fourth display frame;

wherein for one pixel of the pixels, a gray level value of the one pixel for displaying the first display frame is the same as a gray level value of the one pixel for displaying the second display frame, a gray level value of the one pixel for displaying the third display frame is different from a gray level value of the one pixel for displaying the fourth display frame.

3. The 3D image frame display system of claim 1, wherein a time period of the first lens being turned on for passing the light is 1 to 1.2 times a sum period including a time period for forming image in the first display frame and a time period for executing the first display removing frame.

4. The 3D image frame display system of claim 1, wherein the backlight module is turned on for a time period longer than that for continuously turning on the first lens.

5. The 3D image frame display system of claim 1, wherein when the gray values range from 0 to 255, the gray level values of the first display removing frame and the second display removing frame are between 10 to 20.

* * * * *